United States Patent Office 3,591,584
Patented July 6, 1971

3,591,584
BENZOTHIAZINE DIOXIDES
Joseph G. Lombardino, Niantic, Conn., assignor to
Pfizer Inc., New York, N.Y.
No Drawing. Filed Aug. 27, 1968, Ser. No. 767,594
Int. Cl. C07d 93/02
U.S. Cl. 260—243
37 Claims

ABSTRACT OF THE DISCLOSURE

A series of novel 3,4-dihydro-4-oxo-2H-1,2-benzothiazine-3-carboxamide 1,1-dioxides and 3,4-dihydro-3-oxo-2H - 1,2-benzothiazine-4-carboxamide 1,1-dioxides have been prepared, including 3,4-dihydro-2-methyl-4-oxo-2H-1,2-benzothiazine-3-carboxanilide 1,1-dioxide, 3,4-dihydro - 2 - methyl-4-oxo-N-(2-thiazolyl)-2H-1,2-benzothiazine-3-carboxamide 1,1-dioxide, 2',4'-dichloro-3,4-dihydro-2 - methyl - 3 - oxo-2H-1,2-benzothiazine-4-carboxanilide 1,1-dioxide and 4'-bromo-3,4-dihydro-2-methyl-3-oxo-2H-1,2-benzothiazine-4-carboxanilide 1,1-dioxide. All these compounds are useful in therapy as non-steroidal antiinflammatory agents. Alternate methods of preparation are provided and some of these synthetic routes are described in great detail.

BACKGROUND OF THE INVENTION

This invention relates to new and useful benzothiazine dioxides, including their various methods of preparation and novel intermediates useful in connection therewith. More particularly, it is concerned with a novel series of 3,4 - dihydro-4-oxo-2H-1.2-benzothiazine-3-carboxamide 1,1-dioxides and 3,4-dihydro-3-oxo-2H-1,2-benzothiazine-4-carboxamide 1,1-dioxides, which are valuable for their chemotherapeutic properties.

In the past, various attempts have been made by numerous investigators in the field of organic medicinal chemistry to obtain new and useful anti-inflammatory agents. For the most part, these efforts have involved the synthesis and testing of various steroidal hormones such as the corticosteroids. However, in the search for still newer and better anti-flammatory agents, little is known about the effect of non-steroidal agents in this area, albeit they would be attractive since they would necessarily lack the untoward steroidal side-effects.

SUMMARY OF THE INVENTION

In accordance with the present invention, it has now been found that various novel 2H-1,2-benzothiazine 1,1-dioxide, compounds, i.e., non-steroids, are surprisingly, extremely useful when employed in the field of drug therapy as anti-inflammatory agents. The novel compounds of this invention are 3,4-dihydro-2H-1,2-benzothiazine 1,1-dioxides of the formulae:

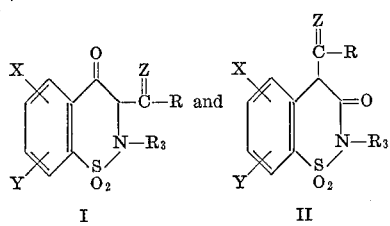

and the base salts thereof with pharmacologically acceptable cations, wherein X and Y are each a member selected from the group consisting of hydrogen, fluorine, chlorine, bromine, nitro, alkyl and alkoxy having from one to five carbon atoms and trifluoromethyl; R is a member selected from the group consisting of —OR$_1$ and —NHR$_2$ wherein R$_1$ is alkyl having from one to twelve carbon atoms or phenylalkyl having up to three carbon atoms in the alkyl moiety, and R$_2$ is chosen from the group consisting of hydrogen, alkyl having from one to eight carbon atoms, alkenyl having up to six carbon atoms, cycloalkyl having up to eight carbon atoms, phenylalkyl having up to three carbon atoms in the alkyl moiety, nitrophenyl, naphthl, phenyl, pyridyl, 3-methyl-2-pyridyl, 4-methyl-2-pyridyl, 5 - methyl-2-pyridyl, 6-methyl-2-pyridyl, 4,6-dimethyl - 2-pyridyl, 5-chloro-2-pyridyl, 5-bromo-2-pyridyl, 5 - nitro-2-pyridyl, 3-hydroxy-2-pyridyl, 5-carboxamido-2-pyridyl, 2-pyrazinyl, 2-pyrimidyl, 4,5-dimethyl-2-pyrimidyl, 4-pyrimidyl, 5-methyl-3-pyridazinyl, 6-methoxy-3-pyridazinyl, 1-phenyl-3-pyrazolonyl, 2-triazolyl, 4-methyl-2 - thiazolyl, 4,5 - dimethyl-2-thiazolyl, 4-phenyl-2-thiazolyl, 5 - bromo - 2-thiazolyl, 3-isothiazolyl, 2-benzothiazolyl, 6 - methyl-2-benzothiazolyl, 4-chloro-2-benzothiazolyl, 6-bromo-2-benzothiazolyl, 5-chloro-2-benzoxazolyl, 1,3,4-thiadiazolyl, 5-methyl-1,3,4-thiadiazolyl, 1,2,4-thiazolyl, 6-phenyl-1,2,4-triazolyl, 7-indazolyl and mono- and di-substituted phenyl wherein each substitutent is halogen, hydroxy, alkoxy and thioalkoxy having up to three carbon atoms, alkyl having up to four carbon atoms, trifluoromethyl, acetyl, methylsulfinyl or methylsulfonyl; R$_3$ is a member selected from the group consisting of hydrogen, alkyl having from one to six carbon atoms, alkenyl having up to four carbon atoms and phenylalkyl having up to three carbon atoms in the alkyl moiety; and Z is oxygen or sulfur, except when R is OR$_1$ when it is oxygen. These novel compounds are all useful in alleviating the painful effects caused by various inflammatory conditions.

Of special interest in this connection are those compounds where X and Y are hydrogen, Z is oxygen, R is —NHR$_2$ wherein R$_2$ is a member selected from the group consisting of phenyl, nitrophenyl, pyridyl, 6-methyl-2-pyridyl, 2-pyrazinyl, 2-pyrimidyl, 2-thiazolyl, 4,5-dimethyl-2-2-thiazolyl, 3-isothiazolyl, 2-benzothiazolyl, 7-indazolyl and mono- and disubstituted phenyl wherein each substituent is halogen, hydroxy, alkoxy and thioalkoxy having up to three carbon atoms, alkyl having up to four carbon atoms, trifluoromethyl, acetyl, methylsulfinyl or methylsulfonyl; R$_3$ is alkyl having from one to six carbon atoms, and Z is oxygen or sulfur. Typical member compounds embraced by this invention include 3,4-dihydro - 2-methyl-4-oxo-2H-1,2,-benzothiazine-3-carboxanilide 1,1-dioxide, 3'-chloro-3,4-dihydro-2-methyl-4-oxo-2H - 1,2 - benzothiazine-3-carboxanilide 1,1-dioxide, 2'-methoxy-3,4 - dihydro-2-methyl-4-oxo-2H-1,2-benzothiazine-3-carboxanilide, 1,1-dioxide, 3'-trifluoro-3,4-dihydro-2-methyl-4-oxo-2H-1,2-benzothiazine-3-carboxanilide 1,1-dioxide, N - (2-thiazolyl)-3,4-dihydro-2-methyl-4-oxo-2H-1,2 - benzothiazine - 3-carboxamide 1,1-dioxide, N-(2-pyridyl) - 3,4-dihydro-2-methyl-4-oxo-2H-1,2-benzothiazine-3 - carboxamide 1,1-dioxide, N-(6-methyl-2-pyridyl)-3,4-dihydro - 4-oxo-2H-1,2-benzothiazine-3-carboxamide 1,1-dioxide, 2',4' - dichloro-3,4-dihydro-2-methyl-3-oxo-2H-1,2-benzothiazine-4-carboxanilide 1,1-dioxide, 4'-bromo-3,4 - dihydro-2-methyl-3-oxo-2H-1,2-benzothiazine-4-carboxanilide 1,1 - dioxide, 2'-chloro-3,4-dihydro-2-methyl-3-oxo-2H-1,2-benzothiazine-4-carboxanilide 1,1-dioxide and 4' - methylsulfonyl - 3,4-dihydro-2-methyl-3-oxo-2H-1,2-benzothiazine-4-carboxanilide 1,1-dioxide. It is to be understood that many of these compounds exist in the enolic form (i.e., they are tautomeric and can be 4-hydroxy or 3-hydroxy, as the case may be).

In addition, the carboxylate esters of this invention, where R is —OR$_1$ as previously defined, are extremely useful as intermediates for preparing the aforementioned carboxamide compounds via the conventional ammonolysis route using the appropriate amines. Typical and preferred esters of this invention, for use in the present connection, include those carboxylates where X and Y are each hydrogen, Z, is oxygen, R is OR₁ wherein R₁ is alkyl having from one to twelve carbon atoms, and R₃ is a member selected from the group consisting of hydrogen and alkyl having from one to six carbon atoms, such as, for example, methyl 3,4-dihydro-2-methyl-4-oxo-2H-1,2-benzothiazine-3-carboxylate 1,1-dioxide and ethyl 3,4-dihydro-2-methyl-3-oxo-2H - 1,2 - benzothiazine - 4 - carboxylate 1,1-dioxide. These compounds also posses antiinflammatory activity.

DETAILED DESCRIPTION OF THE INVENTION

In accordance with the process employed for preparing the novel compounds of this invention, an appropriately substituted 3,4-dihydro-4-oxo-2H - 1,2 - benzothiazine 1,1-dioxide compound or 3,4-dihydro-3-oxo-2H - 1,2 - benzothiazine 1,1-dioxide compound of the formulae:

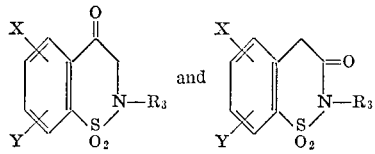

is contacted with an organic isocyanate reagent of the formula R₂NCZ, wherein Z is either oxygen or sulfur and R₂ corresponds to the previously defined organic nitrogen substituent on the carboxamide function of the desired final product. In this way, the corresponding 3- or 4-carboxamide (—CZNHR₂) compound is formed, as the case may be, where R₃ is defined as previously indicated. This particular reaction is normally carried out in a basic solvent medium, most desirably employing a reaction-inert organic solvent such as tetrahydrofuran, dimethylsulfoxide or dimethylformamide and preferably using a slight excess in moles of a base, like triethylamine, which may be admixed with the solvent. Many of the aforesaid isocyanate and isothiocyanate reagents (R₂NCZ) are either known compounds or else they can easily be prepared, using methods well-known to those skilled in the art, starting from readily available materials. In practice, it is usually preferable to employ at least about a molar equivalent of the isocyanate reagent in the instant reaction of the present invention, with best results often being achieved by using just a slight excess of same. Although any temperature below that of reflux may be used in order to effect the reaction, it is normally found most convenient to employ elevated temperatures in almost every case, so as to shorten the required reaction time, which may range anywhere from several minutes up to about 24 hours depending, of course, upon the particular carboxamide compound actually being prepared. Upon completion of the reaction, the product is easily recovered from the spent mixture by pouring same into an excess of ice-water containing a slight excess of acid, such as hydrochloric acid, whereby the carboxamide compound rapidly precipitates from solution and is subsequently collected by such means as suction filtration and the like.

Alternatively, the 3,4-dihydro-4-oxo - 2H - 1,2 - benzothiazine-3-carboxamide 1,1 - dioxide and 3,4- - dihydro-3-oxo-2H-1,2-benzothiazine - 4 - carboxamide 1,1 - dioxide compounds of this invention may also be prepared by treating the corresponding 3- or 4-carboxylic acid esters with at least an equimolar amount of an amine of the formula R₂NH₂, wherein R₂ is as previously defined (some disubstituted amines work also equally as well here). More specifically, this particular process of the invention involves reacting a carbalkoxy ester of the aforesaid type with an appropriate amine base in a reaction-inert organic solvent medium, whereby the desired ammonolysis reaction takes place. The reaction is generally conducted by mixing the two components together in said solvent system at or near room temperature, and then refluxing the resultant system for a period of about one-half to four hours. Although it is only necessary that these two reactants be present in substantially equimolar amounts in order to effect the reaction, a slight excess of one or the other (and preferably the more readily available amine base reagent) is not harmful in this respect and may even serve to shift the ammonolysis reaction to completion. Preferred reaction-inert organic solvents for use in the ammonolysis reaction include such lower N,N-dialkyl alkanamides as dimethylformamide, dimethylacetamide and the like, as well as such aromatic hydrocarbon solvents as benzene, toluene, xylene and so forth. In some instances, where a lower alkyl ester is employed as starting material and the two reactants are mutually miscible, it may even be desirable or at least possible to conduct the reaction in the absence of a solvent. In any event, it may be found most helpful and usually suitable to distill off the volatile alcohol by-product as soon as it is formed in the reaction and thereby shift the ammonolysis equilibrium to completion in this manner. Included among the many typical 3,4-dihydro-4-oxo-2H-1,2 - benzothiazine-3-carboxylate 1,1-dioxide esters and 3,4-dihydro-3-oxo-2H-1,2-benzothiazine-4-carboxylate 1,1-dioxide esters of this invention which may be used as substrates in the ammonolysis reaction are the methyl, ethyl, isopropyl, n-butyl, isoamyl, n-hexyl, 2-ethylhexyl and n-octyl esters. Upon completion of the reaction, the desired carboxamide final product is generally most conveniently isolated from the mixture by distilling off the alcohol by-product, as aforesaid, until the temperature of the volatile alcohol solvent vapors in the distilling head approximates in terms of degrees centigrade the temperature of the reaction mixture in the flask (i.e., the distilland). At this point, the resulting distilland is cooled to room temperature and the product subsequently precipitates therefrom.

The 3,4 - dihydro-3-oxo-2H-1,2-benzothiazine-4-carboxylate 1,1-dioxide esters, used as described above as intermediates to prepare the corresponding 4-carboxamides of the invention, are themselves prepared by means of an alcoholysis reaction starting from certain previously described 4-carboxanilide compounds. For instance, a suitable 4-carboxanilide compound, such as 2'-chloro-3,4-dihydro - 2 - methyl-3-oxo-2H-1,2-benzothiazine-4-carboxanilide 1,1-dioxide, can be refluxed in alcohol to form the corresponding ester of said alcohol in yields as high as 90% or more. This is generally accomplished by heating the carboxanilide compound, as aforesaid, with an excess of said alcohol, preferably a lower alkanol containing up to 6-8 carbon atoms, at a temperature that is in the range of from between about 50° C. and the reflux point of the alcoholic solvent reaction mixture. Although time is not usually a critical factor in this reaction, a period of at least about one hour is considered desirable, but this will, of course, vary depending upon whether a higher or lower reaction temperature is employed. Needless to say, reaction temperatures nearer the reflux point will generally always require less time than lower temperatures in the reaction in order to effect the same degree of conversion to the desired ester. Preferred carboxanilide starting materials for use in the reaction generally include those which have ortho halogen substituents on the phenyl moiety, such as 2'-chlorine, 2'-bromine, etc.

The 3,4-dihydro-4-oxo-2H-1,2-benzothiazine-3-carboxylate 1,1-dioxide esters of this invention, used as intermediates to form the corresponding 3-carboxamides, are prepared by a facile two-step synthesis starting from readily available chemical materials. For instance, in the case of methyl 3,4-dihydro-2-methyl-4-oxo-2H-1,2-benzothiazine-3-carboxylate 1,1-dioxide and related compounds, such products are prepared by simply treating a known 3-oxo-1,2-benzothiazoline-2-acetic acid ester [Chemische Berichte, vol. 30, p. 1267 (1897)] with an alkali metal alkoxide like sodium methoxide in a polar organic solvent, such as dimethyl sulfoxide or dimethylformamide, whereby a rearrangement reaction takes place and the corresponding 3,4 - dihydro-4-oxo-2H-1,2-benzothiazine-3-carboxylate 1,1-dioxide ester is formed upon subsequent acidification. Alkylation of the latter material, by means of an alkyl halide like methyl iodide in the presence of base, then yields the desired 3-carboxylate ester having the requisite substitutent group located at the 2-position of the molecule.

The chemical bases which are used as reagents in this invention to prepare the pharmaceutically acceptable salts of same are those which form non-toxic salts with the many herein described acidic 3,4-dihydro-4-oxo-2H-1,2-benzothiazine 1,1-dioxides and 3,4-dihydro-3-oxo-2H-1,2-benzothiazine 1,1-dioxides, such as N-(2-thiazolyl)-3,4-dihydro - 2-methyl-4-oxo-2H-1,2-benzothiazine-3-carboxamide 1,1-dioxide, for example. These particular non-toxic base salts are of such a nature that their cations are said to be essentially non-toxic in character over the wide range of dosage administered. Examples of such cations include those of sodium, potassium, calcium and magnesium, etc. These salts can easily be prepared by simply treating the aforementioned 3,4-dihydro-2H-1,2-benzothiazine 1,1-dioxides with an aqueous solution of the desired pharmacologically acceptable base, i.e., those oxides, hydroxides, carbonates or bicarbonates which contain pharmacologically acceptable cations, and then evaporating the resulting solution to dryness while preferably under reduced pressure. Alternatively, they may also be prepared by mixing lower alkanolic solutions of the said acidic compounds and the desired alkali metal alkoxide together and then evaporating said resulting solution in the same manner as before. In either case, stoichiometric quantities of reagents must be employed in order to ensure completeness of reaction, with consequent maximum production of yields of the desired pure product. Needless to say, salts of all these compounds with pharmacologically unacceptable bases may also be formed as well and while these latter type salts are not therapeutically useful per se, they may be used as intermediates for both the production of the pharmacologically acceptable salts described above, as well as for the basic purification of the present compounds themselves.

As previously indicated, the 3,4-dihydro-3-oxo-2H-1,2-benzothiazine-4-carboxamide 1,1-dioxide and 3,4-dihydro-4-oxo-2H-1,2-benzothiazine-3-carboxamide 1,1 - dioxide compounds of the present invention are all readily adapted to therapeutic use as anti-inflammatory agents, particularly in view of their ability to reduce the swelling and relieve the pain caused by arthritic and other inflammatory disorders that are normally associated with such basic ailments as rheumatoid arthritis and the like. For instance, 3,4 - dihydro-2-methyl-4-oxo-2H-1,2-benzothiazine-3-carboxanilide 1,1-dioxide and N-(2-thiazolyl)-3,4-dihydro-2-methyl-4-oxo-2H-1,2-benzothiazine-3-carboxamide 1,1-dioxide, both typical and preferred agents of the present invention, exhibit remarkable activity in the standard carrageenin-induced rat foot edema test, where it was found that the former compound is almost four times as potent as phenylbutazone, while the heterocyclic amide agent of this invention is about twice as active as indomethacin. More specifically, 3,4 - dihydro-2-methyl-4-oxo-2H-1,2-benzothiazine-3-carboxanilide 1,1-dioxide and N-(2-thiazolyl) - 3,4 - dihydro - 2-methyl-4-oxo-2H-1,2-benzothiazine-3-carboxamide 1,1-dioxide have been found to exhibit their effect in rats when tested orally at levels ranging from 0.33–33 mg./kg., with both compounds still retaining their extremely potent anti-inflammatory activity in adrenalectomized animals to a significantly high degree. Additionally, none of these compounds cause substantial side effects to occur in the subject to whom they are so administered, i.e., no problems of toxicity or of a harmful pharmacological nature, either gross or microscopic, are encountered when said compounds are administered for the aforestated purposes in the manner described as indicated above.

In accordance with a method of treatment of the present invention, the herein described 3,4-dihidro-2H-1,2- be administered to an afflicted subject via either the oral or parenteral routes of administration. In general, these compounds are most desirably administered in doses ranging from about 10 mg. up to about 1000 mg. per day, although variations will still necessarily occur depending upon the weight of the subject being treated. However, a dosage level that is in the range of from about 0.16 mg. to about 16 mg. per kg. of body weight per day is most desirably employed in order to achieve effective results. Nevertheless, it is still to be appreciated that other variations may also occur in this respect, depending upon the species of animal being treated and its individual response to said medicament, as well as on the particular type of pharmaceutical formulation chosen and the time period and interval at which such administration is carried out. In some instances, dosage levels below the lower limit of the aforesaid range may be more than adequate, while in other cases still larger doses may be employed without causing any harmful or deleterious side effects to occur provided that such higher dose levels are first divided into several smaller doses that are to be administered throughout the day.

In connection with the use of the 3,4-dihydro-2H-1,2-benzothiazine 1,1-dioxide compounds of this invention for the treatment of arthritic subjects, it is to be noted that they may be administered either alone or in combination with pharmaceutically acceptable carriers by either of the routes previously indicated, and that such administration can be carried out in both single and multiple dosages. More particularly, the novel compounds of the invention can be administered in a wide variety of different dosage forms, i.e., they may be combined with various pharmaceutically-acceptable inert carriers in the form of tablets, capsules, lozenges, troches, hard candies, powders, sprays, creams, salves, suppositories, jellies, pastes, lotions, ointments, aqueous suspensions, injectable solutions, elixirs, syrups, and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5% to about 90% by weight of the total composition, i.e., in amounts which are sufficient to provide the desired unit dosage.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelatin capsules; preferred materials in the connection would also include lactose or milk sugar as well as high molecular weight polyethylene glycols. When aqueous suspensions and/or elixirs are desired for oral administration, the essential active ingredient therein may be combined with various sweetening or flavoring agents, coloring matter or dyes, and, if so desired, emulsifying and/or suspending agents as well, together with such diluents as water, ethanol, propylene glycol, glycerin and various like combinations thereof.

For purposes of parenteral administration, solutions of these particular 3,4-dihydro-2H-1,2-benzothiazine 1,1-dioxides in either sesame or peanut oil or in aqueous propylene glycol may be employed, as well as sterile aqueous solutions of the corresponding water-soluble alkali metal or alkaline-earth metal salts previously enumerated. Such aqueous solutions should be suitably buffered if necessary and the liquid diluent first rendered isotonic with sufficient saline or glucose. These particular solutions are especially suitable for intravenous, intramuscular and subcutaneous injection purposes. Additionally, it is also possible to administer the aforesaid benzothiazine dioxide compounds topically when treating inflammatory conditions of the skin and this may be preferably done by way of creams, salves, jellies, pastes, ointments and the like, in accordance with standard pharmaceutical practice.

This invention is still further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

Example I

In a round-bottomed three-necked flask fitted with reflux condenser, magnetic stirrer, dropping funnel and gas-inlet tube, there were placed 0.082 g. (0.0017 mole) of a 50% dispersion of sodium hydride in mineral oil, said dispersion having been washed in n-hexane and the residue, after decantation, suspended in 3 ml. of dry dimethylformamide while under a dry nitrogen atmosphere. Stirring was then commenced and to the resulting gray suspension, there were then added dropwise a combination consisting of 0.316 g. (0.0015 mole) of 3,4-dihydro-2 - methyl - 4 - oxo-2H-1,2-benzothiazine 1,1-dioxide [H. Zinnes et al., J. Org. Chem., vol. 31, p. 162 (1966)] and 0.178 g. (0.0015 mole) of phenyl isocyanate dissolved in 3 ml. of dry dimethylformamide. Foaming and gas evolution occurred during the addition step and when the latter was complete, the reaction mixture was stirred at room temperature (~25° C.) for a period of fifteen minutes and then poured into 15 ml. of cold 3 N hydrochloric acid. The resulting pale yellow precipitate was filtered and then vacuum dried to afford 302 mg. of material melting at 205–215° C. After one recrystallization from isopropanol, there was obtained 208 mg. (42%) of 3,4-dihydro-2-methyl-4-oxo - 2H - 1,2 - benzothiazine-3-carboxanilide 1,1-dioxide, M.P. 213–215° C.

Analysis.—Calcd. for $C_{16}H_{14}N_2OS$ (percent): C, 58.17; H, 4.27; N, 8.48. Found (percent): C, 58.14; H, 4.33; N, 8.14.

Example II

The procedure described in the preceding example was followed except that 6.3 g. (0.030 mole) of 3,4-dihydro-2-methyl-4-oxo-2H-1,2-benzothiazine 1,1-dioxide reacted with 4.65 g. (0.034 mole) of p-fluorophenyl isocyanate in 40 ml. of dry dimethylformamide in the presence of 1.6 g. (0.033 mole) of 50% sodium hydride-oil (hexane washed) suspended in 30 ml. of dry dimethylformamide. Upon completion of the addition step, the reaction mixture was stirred at room temperature (~25° C.) for twenty minutes and then heated on a steam bath for an additional twenty minutes thereafter. After adding 7.5 ml. of methanol to the resulting solution and pouring the latter into 300 ml. of 3 N hydrochloric acid, there were obtained pale yellow crystals which were subsequently collected by means of suction filtration, wash with water and air dried. Recrystallization of the material from boiling isopropanol then afforded 2.98 g. (29%) of 4'-fluoro-3,4-dihydro-2-methyl - 4 - oxo-2H-1,2-benzothiazine-3-carboxanilide 1,1-dioxide, M.P. 238–240° C.

Analysis.—Calcd. for $C_{16}H_{13}FN_2O_4S$ (percent): C, 55.16; H, 3.76. Found (percent): C, 54.97; H, 3.97.

Example III

The procedure described in Example I was repeated using 0.576 g. (0.012 mole) of 50% sodium hydride-oil (hexane-washed) in 15 ml. of dry dimethylformamide, 2.53 g. (0.012 mole) of 3,4-dihydro-2-methyl-4-oxo-2H-1,2-benzothiazine 1,1-dioxide and 2.26 g. (0.012 mole) of 2,5-dichlorophenyl isocyanate in 20 ml. of dry dimethylformamide. Upon completion of the reaction, the resulting mixture was poured into 140 ml. of iced 3 N hydrochloric acid and filtered. The heavy yellow precipitate collected in this manner was then air dried and subsequently dissolved in boiling ethanol, from which pale yellow crystals of 2',5'-dichloro-3,4-dihydro-2-methyl-4-oxo-2H-1,2-benzothiazine - 3 - carboxanilide 1,1-dioxide (M.P. 223–225° C.) soon deposited on slow cooling. The yield of product amounted to 678 mg. (14%).

Analysis.—Calcd. for $C_{16}H_{12}Cl_2N_2O_4S$ (percent): C, 48.13; H, 3.03; N, 7.02. Found (percent): C, 48.09; H, 3.10; N, 6.95.

Example IV

The procedure described in Example I was repeated to prepare the following 3,4-dihydro-2-methyl-4-oxo-2H-1,2-benzothiazine-3-carboxamide 1,1-dioxides, starting from 3,4-dihydro-2-methyl-4-oxo-2H-1,2 - benzothiazine 1,1-dioxide and the appropriate organic isocyanate (or isothiocyanate) reagent in each case:

4'-chloro - 3,4 - dihydro-2-methyl-4-oxo-2H-1,2-benzothiazine-3-carboxanilide 1,1-dioxide, M.P. 230–232° C.

2'-methoxy-3,4 - dihydro - 2-methyl-4-oxo-2H-1,2-benzothiazine-3-carboxanilide 1,1-dioxide, M.P. 178–180° C.

4'-methoxy-3,4-dihydro - 2 - methyl-4-oxo-2H-1,2-benzothiazine-3-carboxanilide 1,1-dioxide, M.P. 250–252° C.

2'-methyl-3,4-dihydro - 2 - methyl-4-oxo-2H-1,2-benzothiazine-3-carboxanilide 1,1-dioxide, M.P. 157–160° C.

4'-methyl-3,4-dihydro - 2 - methyl-4-oxo-2H-1,2-benzothiazine-3-carboxanilide 1,1-dioxide, M.P. 234–236° C.

3'-trifluoromethyl - 3,4 - dihydro-2-methyl-4-oxo-2H-1,2-benzothiazine-3-carboxanilide 1,1-dioxide, M.P. 195–198° C.

3'-chloro - 3,4 - dihydro-2-methyl-4-oxo-2H-1,2-benzothiazine-3-carboxanilide 1,1-dioxide, M.P. 267–269° C. (dec.)

3',4'-dichloro - 3,4-dihydro-2-methyl-4-oxo-2H-1,2-benzothiazine-3-carboxanilide 1,1-dioxide, M.P. 279–281° C. (dec.)

2'-chloro-3,4 - dihydro - 2 - methyl-4-oxo-2H-1,2-benzothiazine-3-carboxanilide 1,1-dioxide, M.P. 197–199° C.

4'-nitro-3,4-dihydro - 2 - methyl-4-oxo-2H-1,2-benzothiazine-3-carboxanilide 1,1-dioxide, M.P. 278–280° C. (dec.)

4'-bromo-3,4-dihydro-2-methyl-4-oxo-2H-1,2-benzothiazine-3-carboxanilide 1,1-dioxide, M.P. 233–236° C.

3'-methyl - 3,4 - dihydro-2-methyl-4-oxo-2H-1,2-benzothiazine-3-carboxanilide 1,1-dioxide, M.P. 219–222° C.

4'-ethoxy-3,4-dihydro - 2 - methyl-4-oxo-2H-1,2-benzothiazine-3-carboxanilide 1,1-dioxide, M.P. 258.5–260.5° C.

N-(α-naphthyl) - 3,4 - dihydro-2-methyl-4-oxo-2H-1,2-benzothiazine-3-carboxamide 1,1 - dioxide, M.P. 226–228° C.

N-cyclohexyl - 3,4-dihydro-2-methyl-4-oxo-2H-1,2-benzothiazine-3-carboxamide 1,1-dioxide, M.P. 177–179° C.

N-allyl - 3,4 - dihydro-2-methyl-4-oxo-2H-1,2-benzothiazine-3-carboxamide 1,1-dioxide, M.P. 137–138.5° C.

N-methyl - 3,4 - dihydro-2-methyl-4-oxo-2H-1,2-benzothiazine-3-carboxamide 1,1-dioxide, M.P. 180–182° C.

N-(n-butyl) - 3,4 - dihydro-2-methyl-4-oxo-2H-1,2-benzothiazine-3-carboxamide 1,1-dioxide, M.P. 117.5–119° C.

3,4-dihydro - 2 - methyl-4-oxo-2H-1,2-benzothiazine-3-thiocarboxanilide 1,1-dioxide, M.P. 236.5–237° C.

N-allyl-3,4-dihydro-2-methyl-4-oxo-2H-1,2-benzothiazine-3-thiocarboxamide 1,1-dioxide, M.P. 181–182° C.

Example V

The procedure described in Example I is employed to prepare the following 3-carboxamide compounds starting from the corresponding 3,4-dihydro-4-oxo-2H-1,2-benzothiazine 1,1-dioxide and the appropriate organic isocyanate or isothiocyanate reagent ($R_2NCZ$) in each case:

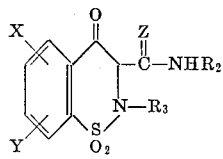

| X | Y | Z | $R_2$ | $R_3$ |
|---|---|---|---|---|
| H | H | O | hydrogen | n-$C_6H_{13}$ |
| 6-$OC_2H_5$ | 7-$OC_2H_5$ | O | n-octyl | $C_6H_5CH_2$ |
| 6-Cl | H | O | hexylenyl | n-$C_3H_7$ |
| 6-Cl | 7-Br | O | cyclooctyl | allyl |
| H | H | O | $C_6H_5(CH_2)_3$ | $C_2H_5$ |
| 5-$CH_3$ | H | O | phenyl | $C_6H_5(CH_2)_2$ |
| 6-$OCH_3$ | H | O | o-nitrophenyl | iso-$C_3H_7$ |
| H | 8-Cl | S | m-nitrophenyl | $C_2H_5$ |
| 5-Cl | H | O | p-nitrophenyl | methallyl |
| 6-Cl | 7-Cl | O | α-naphthyl | n-$C_4H_9$ |
| 6-$C_2H_5$ | 7-$C_2H_5$ | S | β-naphthyl | $C_6H_5(CH_2)_3$ |
| 5-$OC_2H_5$ | H | O | 7-indazolyl | allyl |
| H | 7-$OCH_3$ | O | 2-chlorophenyl | iso-$C_5H_{11}$ |
| 6-Cl | 7-Cl | S | 3-chlorophenyl | n-$C_3H_7$ |
| 5-Br | H | O | 4-chlorophenyl | $C_6H_5CH_2$ |
| 5-(n-$C_4H_9$) | H | O | 2-methylphenyl | methallyl |
| 6-$OC_2H_5$ | H | O | 3-methylphenyl | iso-$C_3H_7$ |
| H | 8-Br | S | 4-methylphenyl | $C_6H_5(CH_2)_2$ |
| 6-Cl | H | S | 2-methoxyphenyl | $C_2H_5$ |
| H | H | O | 3-thiomethoxyphenyl | $CH_3$ |
| 6-Br | H | O | 4-methoxyphenyl | allyl |
| 6-$CH_3$ | 7-$CH_3$ | O | 2,5-dichlorophenyl | n-$C_4H_9$ |
| 6-$OCH_3$ | 7-$OCH_3$ | O | 3,4-dimethylphenyl | $C_6H_5CH_2$ |
| H | H | S | 3,4-dichlorophenyl | iso-$C_4H$ |
| H | 8-Cl | O | 4-(n-butyl)phenyl | $CH_3$ |
| H | H | O | 3-$CF_3$ phenyl | methallyl |
| 5-$CH_3$ | H | O | 2,4-dimethoxyphenyl | $C_2H_5$ |
| H | 8-(n-$C_4H_9$) | S | 2,5-dimethoxyphenyl | $C_6H_5CH_2$ |
| H | H | O | 2-ethoxyphenyl | iso-$C_3H_7$ |
| 6-$OC_5H_{11}$(n) | 7-$OC_5H_{11}$(n) | S | 4-ethoxyphenyl | allyl |
| H | H | O | 3-isopropoxyphenyl | $CH_3$ |
| 6-F | H | S | hydrogen | n-$C_5H_{11}$ |
| 5-(n-$C_5H_{11}$) | H | O | n-propyl | $C_6H_5(CH_2)_2$ |
| 6-$OC_5H_{11}$(iso) | H | S | isoamyl | $C_2H_5$ |
| H | 8-Br | O | methallyl | n-$C_6H_{13}$ |
| 5-$NO_2$ | H | S | cyclohexyl | methallyl |
| 5-Br | 8-Br | O | β-phenylethyl | $C_2H_5$ |
| H | 7-$CF_3$ | S | benzyl | $CH_3$ |
| 6-F | 7-F | S | 4-bromophenyl | $C_6H_5(CH_2)_2$ |
| H | H | O | 4-fluorophenyl | n-$C_3H_7$ |
| 6-$NO_2$ | H | S | 4-$CF_3$ phenyl | allyl |
| 6-$CF_3$ | 7-$CF_3$ | S | 2,3-dichlorophenyl | $C_6H_5CH_2$ |
| 6-Cl | H | O | 5-Cl-2-methoxyphenyl | $C_2H_5$ |
| 6-Br | 7-Br | O | 3,5-dichlorophenyl | iso-$C_4H_9$ |
| 5-$CF_3$ | H | S | 3,5-dimethoxyphenyl | $C_6H_5CH_2$ |
| H | H | O | 4-thiopropoxyphenyl | n-$C_5H_{11}$ |
| H | 7-$OC_5H_{11}$ | S | 2,6-dimethylphenyl | methallyl |
| 6-(n-$C_5H_{11}$) | 7-(n-$C_5H_{11}$) | O | 2-$CH_3O$-5-methylphenyl | $CH_3$ |
| H | 8-$NO_2$ | S | 2,4-dimethylphenyl | iso-$C_4H_9$ |
| H | H | O | 3-Cl-4-methylphenyl | $C_6H_5(CH_2)_2$ |
| 6-$OCH_3$ | 7-$OCH_3$ | O | 3-acetylphenyl | n-$C_6H_{13}$ |
| 5-$OCH_3$ | H | O | 2-Cl-5-$CF_3$ phenyl | $C_2H_5$ |
| H | 7-F | O | 3-$CH_3SO$ phenyl | n-$C_3H_7$ |

Example VI

In a round-bottomed flask (equipped with magnetic stirrer) under a dry nitrogen atmosphere, there were placed 31.4 g. (0.17 mole) of N-methyl o-toluene-sulfonamide dissolved in 600 ml. of dry tetrahydrofuran. This solution was cooled to 0° C., at which point 219 ml. of n-butyl lithium (1.6 M) in n-hexane (0.35 mole) were added dropwise in a rapid manner. After the addition was complete, the reaction mixture was stirred at room temperature (~25° C.) for 15 minutes and then poured slowly into a heavy slurry of approximately 1500 ml. of Dry Ice in diethyl ether, which was also kept under a nitrogen atmosphere. The resulting suspension was then stirred at room temperature for seventy minutes, at which point 500 ml. of water were added and the aqueous mixture thus obtained was subsequently acidified with 700 ml. of concentrated hydrochloric acid. The so-acidified aqueous solution was then concentrated in vacuo to one-third of its original volume and a white solid precipitate soon deposited from the concentrate on cooling to room temperature. The latter solid material was subsequently collected by means of suction filtration and air dried to constant weight to afford 29.1 g. (75%) of 2-(N-methylsulfamyl) phenylacetic acid, M.P. 158–164° C.

To a solution of 29.0 g. (0.13 mole) of the above acid in 1500 ml. of dry benzene, there were added approximately 100 mg. of p-toluenesulfonic acid. The entire system was contained in a round-bottomed flask, equipped with reflux condenser, Dean Stark trap and a drying tube. The solution was then heated to the boiling point and refluxed for two hours thereafterwards, at which point 3.0 ml. of water had separated (i.e., was removed from the reaction mixture). After filtering the hot solution to remove any physical impurities, the resulting filtrate was concentrated in vacuo to near dryness to afford a yellow-brown oil, which subsequently crystallized on cooling to a yellow solid. The latter material (29.3 g.) was then recrystallized from isopropanol-water and there was obtained in this manner 22 g. (61%) of 3,4-dihydro-2-methyl-3-oxo-2H-1,2-benzothiazine 1,1-dioxide, M.P. 89–91° C.

Analysis.—Calcd. for $C_9H_9NO_3S$ (percent): C, 51.17; H, 4.29; N, 6.63. Found (percent): C, 51.42; H, 4.68; N, 6.62.

Example VII

The procedure described in Example I was followed except that 3.09 g. (0.0143 mole) of 3,4-dihydro-2-methyl-3-oxo-2H-1,2-benzothiazine 1,1-dioxide in 20 ml. of dimethylsulfoxide was reacted with 2.2 g. (0.0143 mole) of o-chlorophenyl isocyanate in the presence of 1.45 g. (0.0143 mole) of triethylamine (in place of 50% sodium hydride). The resulting mixture was flushed with nitrogen and then stirred at room temperature (~25° C.) for a period of 20 hours. After pouring the stirred reaction mass into 100 ml. of 3 N hydrochloric acid at 0° C., there was obtained a yellow precipitate which was subsequently collected by means of suction filtration, washed with cold water and dried. The latter material was then dissolved in hot boiling benzene, and the solution which formed was subsequently filtered while hot and allowed to cool to room temperature on standing. In this manner, there were obtained 2.39 g. (46%) of 2'-chloro-3,4-dihydro-2-methyl-3-oxo-2H-1,2-benzothiazine-4-carboxanilide, 1,1 - dioxide in the form of a crystalline deposit, melting at 139–141° C.

*Analysis.*—Calcd. for $C_{16}H_{13}ClN_2O_4S$ (percent): C, 52.67; H, 3.59; N, 7.68. Found (percent): C, 52.91; H, 3.68; N, 7.77.

Example VIII

The procedure described in Example I was followed except that 2.1 g. (0.010 mole) of 3,4-dihydro-2-methyl-3-oxo-2H-1,2-benzothiazine-1,1-dioxide in 15 ml. of dimethylsulfoxide was reacted with 2.0 g. (0.010 mole) of p-bromophenyl isocyanate in the presence of 1.01 g. (0.010 mole) of triethylamine (in place of 50% sodium hydride). Upon completion of the reaction, the resulting mixture was stirred at room temperature (~25° C.) for approximately 20 hours and then poured into 60 ml. of 3 N hydrochloric acid at 0° C. The yellow solid which formed at this point was then filtered, washed with water and dried to give a material that was subsequently crystallized from boiling ethanol. Upon further recrystallization from the same said solvent, there were obtained 990 mg. (24%) of 4'-bromo-3,4-dihydro-2-methyl-3-oxo-2H-1,2-benzothiazine-4-carboxanilid 1,1-dioxide in the form of white needles melting at 162–165° C. (analytical sample, M.P. 165–167° C.).

*Analysis.*—Calcd. for $C_{16}H_{13}BrN_2O_4S$ (percent): C, 46.95; H, 3.20; N, 6.85. Found (percent): C, 46.73; H, 2.94; N, 6.77.

Example IX

The procedure described in Example I was followed except that 2.1 g. (0.010 mole) of 3,4-dihydro-2-methyl-3-oxo-2H-1,2-benzothiazine 1,1-dioxide in 15 ml. of dry dimethylsulfoxide was reacted with 1.9 g. (0.10 mole) of 2,4-dichlorophenyl isocyanate [S. Buchan et al., J. Chem. Soc., 137 (1931)] in the presence of 1.01 g. (0.010 mole) of triethylamine (in place of 50% sodium hydride). Upon completion of the reaction, the resulting mixture was stirred at room temperature (~25° C.) for approximately 17 hours and then poured into 60 ml. of 3 N hydrochloric acid at 0° C. The pale yellow crystals which formed at this point were filtered and subsequently washed on the filter funnel with water. After recrystallization from acetonitrile (~70 ml.), there were obtained 2.3 g. (58%) of 2',4'-dichloro-3,4-dihydro-2-methyl-3-oxo - 2H -1,2 - benzothiazine - 4 - carboxanilide, 1,1 - dioxide, M.P. 201–204° C. (M.P. raised to 206–208° C. after a further recrystallization from acetonitrile).

*Analysis.*—Calcd. for $C_{16}H_{12}Cl_2N_2O_4S$ (percent): C, 48.13; H, 3.03; N, 7.02. Found (percent): C, 48.23; H, 3.09; N, 7.04.

Example X

The procedure described in Example I was followed except that 3.17 g. (0.015 mole) of 3,4-dihydro-2-methyl-3-oxo-2H-1,2-benzothiazine 1,1-dioxide in 30 ml. of dimethylsulfoxide was reacted with 3.4 g. (0.017 mole) of p-methylsulfonylphenyl isocyanate in the presence of 1.52 g. (0.015 mole) of triethylamine. The resulting mixture was flushed with nitrogen and then stirred for approximately 24 hours at room temperature (~25° C.). After steaming the reaction mixture for fifteen minutes, it was slowly poured into 150 ml. of chilled 2 N hydrochloric acid. The slightly gummy yellow precipitate which formed at this point was then filtered and subsequently air dried. Upon crystallization of the latter material from ethanol, there were obtained 1.28 g. (22%) of 4'-methylsulfonyl-3,4 - dihydro - 2 - methyl - 3 - oxo - 2H - 1,2 - benzothiazine-4-carboxanilide 1,1-dioxide in the form of a pale yellows solid, M.P. 177–180° C.

*Analysis.*—Calcd. for $C_{17}H_{16}N_2O_6S_2$ (percent): C, 49.99; H, 3.95; N, 6.80. Found (percent): 49.82; H, 4.03; N, 6.77.

Example XI

The procedure described in Example I was repeated to prepare the following 3,4-dihydro-2-methyl-3-oxo-2H-1,2-benzothiazine-4-carboxamide 1,1-dioxides, starting from 3,4 - dihydro - 2 - methyl - 3 - oxo - 2H - 1,2 - benzothiazine 1,1-dioxide and the appropriate organic isocyanate reagent, and using triethylamine in place of sodium hydride (on the same molar basis) as catalyst, in each case:

3,4-dihydro-2-methyl-3-oxo-2H-1,2-benzothiazine-4-carboxanilide 1,1-dioxide, M.P. 154–156° C.
4'-fluoro-3,4-dihydro-2-methyl-3-oxo-2H-1,2-benzothiazine-4-carboxanilide 1,1-dioxide, M.P. 149–151° C.
4'-chloro-3,4-dihydro-2-methyl-3-oxo-2H-1,2-benzothiazine-4-carboxanilide 1,1-dioxide, M.P. 139–141° C. (dec.)
3'-trifluoromethyl-3,4-dihydro-2-methyl-3-oxo-2H-1,2-benzothiazine-4-carboxanilide 1,1-dioxide, M.P. 130–133° C.
4'-methyl-3,4-dihydro-2-methyl-3-oxo-2H-1,2-benzothiazine-4-carboxanilide 1,1-dioxide, M.P. 151–153° C.
4'-methoxy-3,4-dihydro-2-methyl-3-oxo-2H-1,2-benzothiazine-4-carboxanilide 1,1-dioxide, M.P. 164.5–167° C.
4'-nitro-3,4-dihydro-2-methyl-3-oxo-2H-1,2-benzothiazine-4-carboxanilide 1,1-dioxide, M.P. 198–201° C.
N-(α-naphthyl)-3,4-dihydro-2-methyl-3-oxo-2H-1,2-benzothiazine-4-carboxamide 1,1-dioxide, M.P. 185–188° C.
3'-methyl-3,4-dihydro-2-methyl-3-oxo-2H-1,2-benzothiazine-4-carboxanilide 1,1-dioxide, M.P. 117–120° C.
4'-ethoxy-3,4-dihydro-2-methyl-3-oxo-2H-1,2-benzothiazine-4-carboxanilide 1,1-dioxide, M.P. 159–162° C.
3'-chloro-3,4-dihydro-2-methyl-3-oxo-2H-1,2-benzothiazine-4-carboxanilide 1,1-dioxide, M.P. 174–177° C.
2'-methyl-3,4-dihydro-2-methyl-3-oxo-2H-1,2-benzothiazine-4-carboxanilide 1,1-dioxide, M.P. 161–163° C.
2',5'-dichloro-3,4-dihydro-3-methyl-3-oxo-2H-1,2-benzothiazine-4-carboxanilide 1,1-dioxide, M.P. 183–186° C.
2'-methoxy-3,4-dihydro-2-methyl-3-oxo-2H-1,2-benzothiazine-4-carboxanilide 1,1-dioxide, M.P. 157–159° C.
3',4'-dichloro-3,4-dihydro-2-methyl-3-oxo-2H-1,2-benzothiazine-4-carboxanilide 1,1-dioxide, M.P. 215–217° C.
2'-methyl-4'-nitro-2,4-dihydro-2-methyl-3-oxo-2H-1,2-benzothiazine-4-carboxanilide 1,1-dioxide, M.P. 206–209° C.
N-allyl-3,4-dihydro-2-methyl-3-oxo-2H-1,2-benzothiazine-4-carboxamide 1,1-dioxide, M.P. 120–123° C.
3'-trifluoromethyl-4'-fluoro-3,4-dihydro-2-methyl-3-oxo-2H-1,2-benzothiazine-4-carboxanilide 1,1-dioxide, M.P. 147–150° C.
2',4'-difluoro-3,4-dihydro-2-methyl-3-oxo-2H-1,2-benzothiazine-4-carboxanilide 1,1-dioxide, M.P. 205° C. (dec.)
2'-fluoro-5'-trifluoromethyl-3,4-dihydro-2-methyl-3-oxo-2H-1,2-benzothiazine-4-carboxanilide 1,1-dioxide, M.P. >330° C. (dec.)
2'-trifluoromethyl-4'-bromo-3,4-dihydro-2-methyl-3-oxo-2H-1,2-benzothiazine-4-carboxanilide 1,1-dioxide, M.P. 133–136° C.
4'-trifluoromethyl-3,4-dihydro-2-methyl-3-oxo-2H-1,2-benzothiazine-4-carboxanilide 1,1-dioxide, M.P. 143–146° C.
3'-trifluoromethyl-4'-bromo-2-methyl-3-oxo-2H-1,2-benzothiazine-4-carboxanilide 1,1-dioxide, M.P. 168–171° C.
4'-methylsulfonyl-3,4-dihydro-2-methyl-3-oxo-2H-1,2- benzothiazine-4-carboxanilide 1,1-dioxide, M.P. 177–180° C.
4'-acetyl-3,4-dihydro-2-methyl-3-oxo-2H-1,2-benzothiazine-4-carboxanilide 1,1-dioxide, M.P. 137–139° C.
4'-dimethylsulfamyl-3,4-dihydro-2-methyl-3-oxo-2H-1,2-benzothiazine-4-carboxanilide, 1,1-dioxide, M.P. 121–123° C. (dec.)

Example XII

The procedure described in Example I is employed once again, with triethylamine replacing sodium hydride as the catalyst (on the same molar basis and this time to prepare the following 4-carboxamide compounds, starting from the corresponding 3,4-dihydro-3-oxo-2H-1,2-benzothiazine 1,1-dioxide and the appropriate organic isocyanate or isothiocyanate reagent (R$_2$NCZ) in each instance:

3 - oxo - 1,2 - benzoisothiazolin - 2 - acetate 1,1-dioxide [Chemische Berichte, vol. 30, p. 1267 (1897)] and the reaction flask containing the system was then immediately immersed in an ice-methanol bath in order to regulate the resulting exothermic reaction. After the initial reaction had subsided (the temperature rose to 55–60° C. with the first 10–15 seconds), the resulting deep red solution was cooled to 30° C. and the ice bath removed. The solution was then stirred under a dry nitrogen atmosphere at 30° C. for exactly four minutes, cooled quickly to 18° C. and then immediately poured into 4.8 liters of 3 N hydrochloric acid solution admixed with ice. The resulting slurry was stirred for approximately 15 minutes, filtered, and the filter cake so obtained was subsequently washed with water and air dried to give 250 g. of crude product.

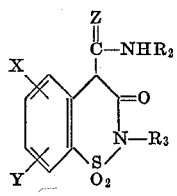

| X | Y | Z | R$_2$ | R$_3$ |
|---|---|---|---|---|
| H | H | O | hydrogen | n-C$_6$H$_{13}$ |
| 6-OC$_2$H$_5$ | 7-OC$_2$H$_5$ | O | n-octyl | C$_6$H$_5$CH$_2$ |
| 6-Cl | H | O | hexylenyl | n-C$_3$H$_7$ |
| 6-Cl | 7-F | O | cyclooctyl | allyl |
| H | H | O | C$_6$H$_5$(CH$_2$)$_3$ | C$_2$H$_5$ |
| 5-CH$_3$ | H | O | phenyl | C$_6$H$_5$(CH$_2$)$_2$ |
| 6-OCH$_3$ | H | O | o-nitrophenyl | iso-C$_3$H$_7$ |
| H | 8-Cl | S | m-nitrophenyl | C$_2$H$_5$ |
| 5-Cl | H | O | p-nitrophenyl | methallyl |
| 6-Cl | 7-Cl | O | α-naphthyl | n-C$_4$H$_9$ |
| 6-C$_2$H$_5$ | 7-C$_2$H$_5$ | S | β-naphthyl | C$_6$H$_5$(CH$_2$)$_3$ |
| 5-OC$_2$H$_5$ | H | O | 7-indazolyl | allyl |
| H | 7-OCH$_3$ | O | 2-chlorophenyl | iso-C$_5$H$_{11}$ |
| 6-Cl | 7-Cl | S | 3-chlorophenyl | n-C$_3$H$_7$ |
| 5-F | H | O | 4-chlorophenyl | C$_6$H$_5$CH$_2$ |
| 5-(n-C$_4$H$_9$) | H | O | 2-methylphenyl | methallyl |
| 6-OC$_2$H$_5$ | H | O | 3-methylphenyl | iso-C$_3$H$_7$ |
| H | 8-Cl | S | 4-methylphenyl | C$_6$H$_5$(CH$_2$)$_2$ |
| 6-Cl | H | S | 2-methoxyphenyl | C$_2$H$_5$ |
| H | H | O | 3-thiomethoxyphenyl | CH$_3$ |
| 6-F | H | O | 4-methoxyphenyl | allyl |
| 6-CH$_3$ | 7-CH$_3$ | O | 2,5-dichlorophenyl | n-C$_4$H$_9$ |
| 6-OCH$_3$ | 7-OCH$_3$ | O | 3,4-dimethylphenyl | C$_6$H$_5$CH$_2$ |
| H | H | S | 3,4-dichlorophenyl | iso-C$_4$H$_9$ |
| H | 8-Cl | O | 4-(n-butyl)phenyl | CH$_3$ |
| 5-CH$_3$ | H | O | 3-CF$_3$ phenyl | methallyl |
| H | H | O | 2,4-dimethoxyphenyl | C$_2$H$_5$ |
| H | 8-(n-C$_4$H$_9$) | S | 2,5-dimethoxyphenyl | C$_6$H$_5$CH$_2$ |
| H | H | O | 2-ethoxyphenyl | iso-C$_3$H$_7$ |
| 6-OC$_5$H$_{11}$(n) | 7-OC$_5$H$_{11}$(n) | S | 4-ethoxyphenyl | allyl |
| H | H | O | 3-isopropoxyphenyl | CH$_3$ |
| 6-F | H | S | hydrogen | n-C$_5$H$_{11}$ |
| 5-(n-C$_5$H$_{11}$) | H | O | n-propyl | C$_6$H$_5$(CH$_2$)$_2$ |
| 6-OC$_5$H$_{11}$(iso) | H | S | isoamyl | C$_2$H$_5$ |
| H | 8-F | O | methallyl | n-C$_6$H$_{13}$ |
| 5-NO$_2$ | H | S | cyclohexyl | methallyl |
| 5-Cl | 8-Cl | O | β-phenylethyl | C$_2$H$_5$ |
| H | 7-CF$_3$ | S | benzyl | CH$_3$ |
| 6-F | 7-F | S | 4-bromophenyl | C$_6$H$_5$(CH$_2$)$_2$ |
| H | H | O | 4-fluorophenyl | n-C$_3$H$_7$ |
| 6-NO$_2$ | H | S | 4-CF$_3$ phenyl | allyl |
| 6-CF$_3$ | 7-CF$_3$ | S | 2,3-dichlorophenyl | C$_6$H$_5$CH$_2$ |
| 6-Cl | H | O | 5-Cl-2-methoxyphenyl | C$_2$H$_5$ |
| 6-Cl | 7-Cl | O | 3,5-dichlorophenyl | iso-C$_4$H$_9$ |
| 5-CF$_3$ | H | S | 3,5-dimethoxyphenyl | C$_6$H$_5$CH$_2$ |
| H | H | O | 4-thiopropoxyphenyl | n-C$_5$H$_{11}$ |
| H | 7-OC$_5$H$_{11}$ | S | 2,6-dimethylphenyl | methallyl |
| 6-(n-C$_5$H$_{11}$) | 7-(n-C$_5$H$_{11}$) | O | 2-CH$_3$O-5-methylphenyl | CH$_3$ |
| H | 8-NO$_2$ | S | 2,4-dimethylphenyl | n-C$_4$H$_9$ |
| H | H | O | 3-Cl-4-methylphenyl | C$_6$H$_5$(CH$_2$)$_2$ |
| 6-OCH$_3$ | 7-OCH$_3$ | O | 3-acetylphenyl | n-C$_6$H$_{13}$ |
| 5-OCH$_3$ | H | O | 2-Cl-5-CF$_3$ phenyl | C$_2$H$_5$ |
| H | 7-F | O | 3-CH$_3$SO phenyl | n-C$_3$H$_7$ |

Example XIII

A slurry of 189.6 g. (3.51 mole) of sodium methoxide in 1.4 liters of dry dimethylsulfoxide was stirred at room temperature (~25° C.), while under a dry nitrogen atmosphere. To the stirred slurry, there were then added in one complete portion 300 g. (1.17 moles) of methyl Recrystallization of the latter material from a chloroform-ethanol mixture (1:1 by volume) in the presence of charcoal then afforded a 61% yield of methyl 3,4-dihydro-4-oxo-2H-1,2-benzothiazine-3-carboxylate 1,1-dioxide, M.P. 158–163° C. After two recrystallizations from isopropanol, the melting point of the product was raised to 173–174° C.

Analysis.—Calcd. for $C_{10}H_9NO_5S$ (percent): C, 47.05; H, 3.55; N, 5.49. Found (percent): C, 47.14; H, 3.58; N, 5.62.

Example XIV

The procedure described in Example XIII is repeated to prepare the following 3,4-dihydro-4-oxo-2H-1,2-benzothiazine-3-carboxylate 1,1-dioxides, starting from the corresponding 3-oxo-1,2-benzoisothiazolin-2-acetate 1,1-dioxide and the appropriate sodium alkoxide ($NaOR_1$) reagent in each instance:

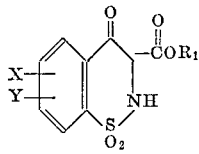

| X | Y | $R_1$ |
|---|---|---|
| H | H | $C_2H_5$ |
| 6-$OC_2H_5$ | 7-$OC_2H_5$ | n-$C_3H_7$ |
| 6-Cl | H | iso-$C_3H_7$ |
| 6-Cl | 7-Br | n-$C_4H_9$ |
| H | H | tert-$C_4H_9$ |
| 5-$CH_3$ | H | n-$C_5H_{11}$ |
| 6-$OCH_3$ | H | iso-$C_5H_{11}$ |
| H | 8-Cl | n-$C_6H_{13}$ |
| 5-Cl | H | n-$C_7H_{15}$ |
| 6-Cl | 7-Cl | n-$C_8H_{17}$ |
| 6-$C_2H_5$ | 7-$C_2H_5$ | n-$C_9H_{19}$ |
| 5-$OC_2H_5$ | H | n-$C_{10}H_{21}$ |
| H | 7-$OCH_3$ | n-$C_{12}H_{25}$ |
| 6-Cl | 7-Cl | $C_6H_5CH_2$ |
| 5-Br | H | $C_6H_5(CH_2)_2$ |
| 5-(n-$C_4H_9$) | H | $C_6H_5(CH_2)_3$ |
| 6-$OC_2H_5$ | H | $CH_3$ |
| H | 8-Br | $C_2H_5$ |
| 6-Cl | H | n-$C_3H_7$ |
| H | H | iso-$C_3H_7$ |
| 6-Br | H | n-$C_4H_9$ |
| 6-$CH_3$ | 7-$CH_3$ | iso-$C_4H_9$ |
| 6-$OCH_3$ | 7-$OCH_3$ | n-$C_5H_{11}$ |
| H | H | iso-$C_5H_{11}$ |
| H | 8-Cl | n-$C_7H_{15}$ |
| H | H | n-$C_8H_{17}$ |
| 5-$CH_3$ | H | n-$C_9H_{19}$ |
| H | 8-(n-$C_4H_9$) | n-$C_{11}H_{23}$ |
| H | H | n-$C_{12}H_{25}$ |
| 6-$OC_5H_{11}$(n) | 7-$OC_5H_{11}$(n) | $C_6H_5CH_2$ |
| H | H | $C_6H_5(CH_2)_2$ |
| 6-F | H | $C_6H_5(CH_2)_3$ |
| 5-(n-$C_5H_{11}$) | H | $CH_3$ |
| 6-$OC_5H_{11}$(iso) | H | $C_2H_5$ |
| H | 8-Br | n-$C_3H_7$ |
| 5-$NO_2$ | H | iso-$C_3H_7$ |
| 5-Br | 8-Br | n-$C_4H_9$ |
| H | 7-$CF_3$ | iso-$C_4H_9$ |
| 6-F | 7-F | tert-$C_4H_9$ |
| H | H | n-$C_3H_{11}$ |
| 6-$NO_2$ | H | iso-$C_5H_{11}$ |
| 6-$CF_3$ | 7-$CF_3$ | n-$C_6H_{13}$ |
| 6-Cl | H | n-$C_9H_{13}$ |
| 6-Br | 7-Br | n-$C_8H_{11}$ |
| 5-$CF_3$ | H | n-$C_9H_{19}$ |
| n-$C_{10}H_{21}$ | H | H |
| H | 7-$OC_5H_{11}$ | n-$C_{11}H_{23}$ |
| 6-(n-$C_5H_{11}$) | 7-(n-$C_5H_{11}$) | n-$C_{12}H_{25}$ |
| H | 8-$NO_2$ | $C_6H_5CH_2$ |
| H | H | $C_6H_5(CH_2)_3$ |
| n-$C_4H_9$ | 6-$OCH_3$ | 7-$OCH_3$ |
| 5-$OCH_3$ | H | $CH_3$ |
| H | 7-F | $C_2H_5$ |

Example XV

A 22-liter round-bottomed flask was charged with 800 g. (3.13 moles) of methyl 3,4-dihydro-4-oxo-2H-1,2-benzothiazine-3-carboxylate 1,1-dioxide, 3.2 liters of water, 9.6 liters of 95% ethanol, 673 ml. of methyl iodide (1.53 kg., 10.87 moles) and 3.14 liters of 1 N aqueous sodium hydroxide. The reaction mixture was then stirred for 30 minutes at ambient temperatures, while under a nitrogen atmosphere, and the resulting clear solution was thereafter stored at room temperature (~25° C.) for 23 hours. The slurry which formed at this point was then chilled at 0° C. and filtered. After washing the filter cake twice with water and once with cold ethanol and then with diethyl ether, there were obtained, upon air-drying, 537 g. of crude product melting at 162–165° C. Recrystallization of the latter material from 1.25 liters of acetonitrile then gave 469 g. (55%) of pure methyl 3,4-dihydro-2-methyl-4-oxo-2H - 1,2 - benzothiazine-3-carboxylate 1,1-dioxide, M.P. 165–168° C.

Analysis.—Calcd. for $C_{11}H_{11}NO_5S$ (percent): C, 49.06; H, 4.12; N, 5.20. Found (percent): C, 49.08; H, 4.08; N, 5.15.

Example XVI

The procedure described in the preceding example was repeated to prepare the following methyl 3,4-dihydro-2-alkyl-4-oxo - 2H - 1,2-benzothiazine-3-carboxylate 1,1-dioxides, starting from methyl 3,4-dihydro-4-oxo-2H-1,2-benzothiazine-3-carboxylate 1,1-dioxide and the appropriate alkyl iodide in each instance:

methyl 3,4-dihydro-2-ethyl-4-oxo-2H-1,2-benzothiazine-3-carboxylate 1,1-dioxide, M.P. 97–99° C.
methyl 3,4-dihydro-2-(n-propyl)-4-oxo-2H-1,2-benzothiazine-3-carboxylate 1,1-dioxide, M.P. 125–127° C.
methyl 3,4-dihydro-2-(n-butyl)-4-oxo-2H-1,2-benzothiazine-3-carboxylate 1,1-dioxide, M.P. 88–90° C.

Example XVII

A mixture consisting of 5.1 g. (0.020 mole) of methyl 3,4-dihydro-4-oxo-2H-1,2-benzothiazine - 3 - carboxylate 1,1-dioxide, 20 ml. of water, 60 ml. of ethanol, 6.8 g. (0.04 mole) of α-bromotoluene and 20 ml. of 1 N sodium hydroxide was stirred at room temperature (~25° C. for a period of approximately 16 hours. Upon cooling to 0° C., the resulting white precipitate was filtered and subsequently washed with water on the filter funnel. After vacuum drying, there was obtained a 5.5 g. (80%) yield of methyl 3,4-dihydro-2-benzyl-4-oxo-2H-1,2-benzothiazine-3-carboxylate 1,1-dioxide, M.P. 157–159° C.

Analysis—Calcd. for $C_{17}H_{15}NO_5S$ (percent): C, 59.20; H, 4.40; N, 4.07. Found (percent): C, 59.32; H, 4.50; N, 4.12.

Example XVIII

A mixture consisting of 8.3 g. (0.0325 mole) of methyl 3,4-dihydro-4-oxo-2H-1,2-benzothiazine - 3 - carboxylate 1,1-dioxide, 100 ml. of ethanol, 25 ml. of water, 33 ml. of 1 N sodium hydroxide and 8.5 g. (0.070 mole) of allyl bromide was stirred at room temperature for approximately 22 hours. At the end of this time, the resulting clear solution was evaporated under reduced pressure to afford an oil, which was subsequently triturated with warm ethanol until a clear solution was again attained. On cooling slowly to 0° C., a solid precipitate soon formed and after collecting the latter material on a filter funnel, followed by vacuum drying, there were obtained 5.9 g. (62%) of methyl 3,4-dihydro-2-allyl-4-oxo-2H-1,2-benzothiazine-3-carboxylate 1,1-dioxide, M.P. 96–99° C.

Analysis.—Calcd. for $C_{13}H_{13}NO_5S$ (percent): C, 52.90; H, 4.44; N, 4.75. Found (percent): C, 52.34; H, 4.43; N, 5.06.

Example XIX

The procedure described in the preceding example was followed to prepare the corresponding 2-methallyl compound, starting from methyl 3,4-dihydro-4-oxo-2H-1,2-benzothiazine-3-carboxylate 1,1-dioxide and using methallyl bromide as reagent in place of allyl bromide, but on the same molar basis as before. In this particular case, methyl 3,4-dihydro-2-methallyl-4-oxo - 2H-1,2 - benzothiazine-3-carboxylate 1,1-dioxide (M.P. 120–122° C.) was the actual product obtained.

Example XX

The procedure described in Examples XV–XIX is employed here to prepare the following 2-substituted 3-carboxylates starting from the corresponding 2-unsubstituted 3,4-dihydro-4-oxo-2H-1,2-benzothiazine-3-carboxyllate 1,1-dioxide compound and appropriate alkylating reagent (e.g. $R_3Br$ or $R_3I$) in each instance:

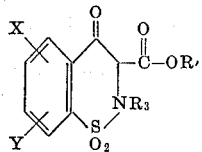

| X | Y | R' | $R_3$ |
|---|---|---|---|
| H | H | $C_2H_5$ | n-$C_6H_{13}$ |
| 6-$OC_2H_5$ | 7-$OC_2H_5$ | n-$C_3H_7$ | $C_6H_5CH_2$ |
| 6-Cl | H | iso-$C_3H_7$ | n-$C_3H_7$ |
| 6-Cl | 7-Br | n-$C_4H_9$ | allyl |
| H | H | tert.-$C_4H_9$ | $C_2H_5$ |
| 5-CH | H | n-$C_5H_{11}$ | $C_6H_5(CH_2)_2$ |
| 6-$OCH_3$ | H | iso-$C_5H_{11}$ | iso-$C_3H_7$ |
| H | 8-Cl | n-$C_6H_{13}$ | $C_2H_5$ |
| 5-Cl | H | n-$C_7H_{15}$ | methallyl |
| 6-Cl | 7-Cl | n-$C_8H_{17}$ | n-$C_4H_9$ |
| 66-$C_2H_5$ | 7-$C_2H_5$ | n-$C_9H_{19}$ | $C_6H_5(CH_2)_3$ |
| 5-$OC_2H_5$ | H | n-$C_{10}H_{21}$ | allyl |
| H | 7-$OCH_3$ | n-$C_{12}H_{25}$ | iso-$C_5H_{11}$ |
| -Cl | 7-Cl | $C_6H_5CH_2$ | n-$C_3H_7$ |
| 5-Br | H | $C_6H_5(CH_2)_2$ | $C_6H_5CH_2$ |
| 5-(n-$C_4H_9$) | H | $C_6H_5(CH_2)_3$ | methallyl |
| 6-$OC_2H_5$ | H | $CH_3$ | iso-$C_3H_7$ |
| H | 8-Br | $C_2H_5$ | $C_6H_5(CH_2)_2$ |
| 6-Cl | H | n-$C_3H_7$ | $C_2H_5$ |
| H | H | iso-$C_3H_7$ | $CH_3$ |
| 6-Br | H | n-$C_4H_9$ | allyl |
| 6-$CH_3$ | 7-$CH_3$ | iso-$C_4H_9$ | n-$C_4H_9$ |
| 6-$OCH_3$ | 7-$OCH_3$ | n-$C_5H_{11}$ | $C_6H_5CH_2$ |
| H | H | iso-$C_5H_{11}$ | iso-$C_4H_9$ |
| H | 8-Cl | n-$C_7H_{15}$ | $CH_3$ |
| H | H | n-$C_8H_{17}$ | methallyl |
| 5-$CH_3$ | H | n-$C_9H_{19}$ | $C_2H_5$ |
| H | 8-(n-$C_4H_9$) | n-$C_{10}H_{21}$ | $C_6H_5CH_2$ |
| H | H | n-$C_{12}H_{25}$ | iso-$C_3H_7$ |
| 6-$OC_5H_{11}$(n) | 7-$OC_5H_{11}$(n) | $C_6H_5CH_2$ | allyl |
| H | H | $C_6H_5(CH_2)_2$ | $CH_3$ |
| 6-F | H | $C_6H_5(CH_2)_2$ | n-$C_5H_{11}$ |
| 5-(n-$C_5H_{11}$) | H | $CH_3$ | $C_6H_5(CH_2)_2$ |
| 6-$OC_5H_{11}$(iso) | H | $C_2H_5$ | $C_2H_5$ |
| H | 8-Br | n-$C_3H_7$ | n-$C_6H_{13}$ |
| 5-$NO_2$ | H | iso-$C_3H_7$ | methallyl |
| 5-Br | 8-Br | n-$C_4H_9$ | $C_2H_5$ |
| H | 7-$CF_3$ | iso-$C_4H_9$ | $CH_3$ |
| 6-F | 7-F | tert.-$C_4H_9$ | $C_6H_5(CH_2)_2$ |
| H | H | n-$C_5H_{11}$ | n-$C_3H_7$ |
| 6-$NO_2$ | H | iso-$C_5H_{11}$ | allyl |
| 6-$CF_3$ | 7-$CF_3$ | n-$C_6H_{13}$ | $C_6H_5CH_2$ |
| 6-Cl | H | n-$C_7H_{15}$ | $C_2H_5$ |
| 6-Br | 7-Br | n-$C_8H_{17}$ | iso-$C_4H_9$ |
| 5-$CF_3$ | H | n-$C_9H_{19}$ | $C_6H_5CH_2$ |
| H | H | n-$C_{10}H_{21}$ | n-$C_5H_{11}$ |
| H | 7-$OC_5H_{11}$ | n-$C_{11}H_{23}$ | methallyl |
| 6-(n-$C_5H_{11}$) | 7-(n-$C_5H_{11}$) | n-$C_{12}H_{25}$ | $CH_3$ |
| H | 8-$NO_2$ | $C_6H_5CH_2$ | iso-$C_4H_9$ |
| H | H | $C_6H_5(CH_2)_3$ | $C_6H_5(CH_2)_2$ |
| 6-$OCH_3$ | 7-$OCH_3$ | n-$C_4H_9$ | n-$C_6H_{13}$ |
| 5-$OCH_3$ | H | $CH_3$ | $C_2H_5$ |
| H | 7-F | $C_2H_5$ | n-$C_3H_7$ |

Example XXI

In a round-bottomed flask equipped with nitrogen-inlet and drying tubes, there were placed 20.2 g. (0.075 mole) of methyl 3,4 - dihydro - 2 - methyl - 4 - oxo-2H-1,2-benzothiazine - 3 - carboxylate 1,1 - dioxide and 14 g. (0.150 mole) of aniline in 100 ml. of dry dimethylacetamide together with approximately 25 mg. of p-toluenesulfonic acid. Nitrogen gas was then bubbled into the mixture via the inlet tube and the resulting yellow suspension was heated at 130° C. for 21 hours, with solution being immediately effected during the first five minutes of heating. Upon completion of this reaction step, the resulting clear yellow solution was cooled to room temperature and then poured slowly into 800 ml. of iced 3 N hydrochloric acid. The yellow crystals which formed at this point were then removed by means of suction filtration and air dried. Recrystallization of the isolated material from isopropanol then gave 8.8 g. (35%) of 3,4 - dihydro - 2 - methyl-4 - oxo - 2H - 1,2-benzothiazine-3-carboxanilide 1,1-dioxide, M.P. 216–216.5° C., and identical in every respect with the product of Example I.

*Analysis.*—Calcd. for $C_{16}H_{14}N_2O_4S$ (percent): C, 58.17; H, 4.27; N, 8.48; S, 9.71. Found (percent): C, 58.37; H, 4.23; N, 8.28; S, 9.59.

Example XXII

The procedure described in Example XXI was repeated to prepare the following 3,4 - dihydro - 2 - methyl - 4 - oxo - 2H - 1,2 - benzothiazine - 3 - carboxamide 1,1-dioxides, starting from methyl 3,4 - dihydro - 2 - methyl-4 - oxo - 2H - 1,2 - benzothiazine - 3 - carboxylate 1,1-dioxide and the appropriate primary organic amine reagent in each case:

2',4'-dichloro-3,4-dihydro-2-methyl-4-oxo-2H-1,2-benzothiazine-3-carboxanilide 1,1-dioxide, M.P. 257–259° C. (dec.)

2',4'-dimethoxy-3,4-dihydro-2-methyl-4-oxo-2H-1,2-benzothiazine-3-carboxanilide 1,1-dioxide, M.P. 192–194° C.

3',4'-dimethyl-3,4-dihydro-2-methyl-4-oxo-2H-1,2-benzothiazine-3-carboxanilide 1,1-dioxide, M.P. 224–225° C.

4'-trifluoromethyl-3,4-dihydro-2-methyl-4-oxo-2H-1,2-benzothiazine-3-carboxanilide 1,1dioxide, M.P. 248–250° C.

3'-chloro-4'-methyl-3,4-dihydro-2-methyl-4-oxo-2H-1,2-benzothiazine-3-carboxanilide 1,1-dioxide, M.P. 253–254° C.

2'-methyl-3'-chloro-3,4-dihydro-2-methyl-4-oxo-2H-1,2-benzothiazine-3-carboxanilide 1,1-dioxide, M.P. 197–199° C.

3'-bromo-3,4-dihydro-2-methyl-4-oxo-2H-1,2-benzothiazine-3-carboxanilide 1,1dioxide, M.P. 274–275° C.

[N-(β-phenylethyl)]-3,4-dihydro-2-methyl-4-oxo-2H-1,2-benzothiazine-3-carboxamide 1,1-dioxide, M.P. 124–126° C.

3'-hydroxy-3,4-dihydro-2-methyl-4-oxo-2H-1,2-benzothiazine-3-carboxanilide 1,1-dioxide, M.P. 225–227° C.

2'-methoxy-5'-chloro-3,4-dihydro-2-methyl-4-oxo-2H-1,2-benzothiazine-3-carboxanilide 1,1-dioxide, M.P. 256–257° C.

2'-fluoro-5'-trifluoromethyl-3,4-dihydro-4-oxo-2H-1,2-benzothiazine-3-carboxanilide 1,1-dioxide, M.P. 183–185° C.

N-cycloheptyl-3,4-dihydro-2-methyl-4-oxo-2H-1,2-benzothiazine-3-carboxamide 1,1-dioxide, M.P. 192–194° C.

2'-trifluoromethyl-4'-chloro-3,4-dihydro-4-oxo-2H-1,2-benzothiazine-3-carboxanilide 1,1-dioxide, M.P. 204–205° C.

3',5'-dichloro-3,4-dihydro-2-methyl-4-oxo-2H-1,2-benzothiazine-3-carboxanilide 1,1-dioxide, M.P. 284–285° C. (dec.).

3'-fluoro-3,4-dihydro-2-methyl-4-oxo-2H-1,2-benzothiazine-3-carboxanilide 1,1-dioxide, M.P. 248–249° C. (dec.).

N-benzyl-3,4-dihydro-2-methyl-4-oxo-2H-1,2-benzothiazine-3-carboxamide 1,1-dioxide, M.P. 193–195° C.

2'-trifluoromethyl-3,4-dihydro-2-methyl-4-oxo-2H-1,2-benzothiazine-3-carboxanilide 1,1-dioxide, M.P. 185–187° C.

2'-chloro-5'-trifluoromethyl-3,4-dihydro-2-methyl-4-oxo-2H-1,2-benzothiazine-3-carboxanilide 1,1-dioxide, M.P. 205–207° C.

3'-trifluoromethyl-4'-chloro-3,4-dihydro-2-methyl-4-oxo-2H-1,2-benzothiazine-3-carboxanilide 1,1-dioxide, M.P. 255–256° C. (dec.).

3'-chloro-4'-fluoro-3,4-dihydro-2-methyl-4-oxo-2H-1,2-benzothiazine-3-carboxanilide 1,1-dioxide, M.P. 249-250° C. (dec.).

4'-hydroxy-3,4-dihydro-2-methyl-4-oxo-2H-1,2-benzothiazine-3-carboxanilide 1,1-dioxide, M.P. 279–280° C. (dec.).

2'-hydroxy-3,4-dihydro-2-methyl-4-oxo-2H-1,2-benzothiazine-3-carboxanilide 1,1 dioxide, M.P. 205–208° C.

3'hydroxy-3,4-dihydro-2-methyl-4-oxo-2H-1,2-benzothiazine-3-carboxanilide 1,1-dioxide, M.P. 231–232° C.

3'-methoxy-3,4-dihydro-2-methyl-4-oxo-2H-1,2-benzothiazine-3-carboxanilide 1,1-dioxide, M.P. 218–220° C.

3',4'dimethoxy-3,4-dihydro-2-methyl-4-oxo-2H-1,2- benzothiazine-3-carboxanilide 1,1-dioxide, M.P. 214–216° C.
2'-bromo-3,4-dihydro-2-methyl-4-oxo-2H-1,2-benzothiazine-3-carboxanilide 1,1-dioxide, M.P. 198–200° C.
4'-(n-butyl)-3,4-dihydro-2-methyl-4-oxo-2H-1,2-benzothiazine-3-carboxanilide 1,1-dioxide, M.P. 177–178° C.
2'-hydroxy-4'-chloro-3,4-dihydro-2-methyl-4-oxo-2H-1,2-benzothiazine-3-carboxanilide 1,1-dioxide, M.P. 266–267° C. (dec.)
2'-methyl-5'-chloro-3,4-dihydro-2-methyl-4-oxo-2H-1,2-benzothiazine-3-carboxanilide 1,1-dioxide, M.P. 191–192° C.
2',5'-dibromo-3,4-dihydro-2-methyl-4-oxo-2H-1,2-benzothiazine-3-carboxanilide 1,1-dioxide, M.P. 228–230° C.
2',3'-dichloro-3,4-dihydro-2-methyl-4-oxo-2H-1,2-benzothiazine-3-carboxanilide 1,1-dioxide, M.P. 210–212° C.
2',4'-difluoro-3,4-dihydro-2-methyl-4-oxo-2H-1,2-benzothiazine-3-carboxanilide 1,1-dioxide, M.P. 211–212° C.
2',5'-difluoro-3,4-dihydro-2-methyl-4-oxo-2H-1,2-benzothiazine-3-carboxanilide 1,1- dioxide, M.P. 205–207° C.
2',5'-dimethoxy-3,4-dihydro-2-methyl-4-oxo-2H-1,2-benzothiazine-3-carboxanilide 1,1-dioxide, M.P. 156–157° C.
3',5'-dimethoxy-3,4-dihydro-2-methyl-4-oxo-2H-1,2-benzothiazine-3-carboxanilide 1,1-dioxide, M.P. 211–212° C.
2',3'-dimethyl-3,4-dihydro-2-methyl-4-oxo-2H-1,2-benzothiazine-3-carboxanilide 1,1-dioxide, M.P. 211–212° C.
2',5'-dimethyl-3,4-dihydro-2-methyl-4-oxo-2H-1,2-benzothiazine-3-carboxanilide 1,1-dioxide, M.P. 156–158° C.
2'-ethyl-3,4-dihydro-2-methyl-4-oxo-2H-1,2-benzothiazine-3-carboxanilide 1,1-dioxide, M.P. 156–158° C.
N-(7-indazolyl)-2-methyl-3,4-dihydro-4-oxo-2H-1,2-benzothiazine-3-carboxamide 1,1-dioxide, M.P. 248–250° C.
2'-fluoro-3,4-dihydro-2-methyl-4-oxo-2H-1,2-benzothiazine-3-carboxanilide 1,1-dioxide, M.P. 183–184° C.
2'-fluoro-5'-methyl-3,4-dihydro-2-methyl-4-oxo-2H-1,2-benzothiazine-3-carboxanilide 1,1-dioxide, M.P. 180–182° C.
2'-methtyl-5'-fluoro-3,4-dihydro-2-methyl-4-oxo-2H-1,2-benzothiazine-3-carboxanilide 1,1-dioxide, M.P. 166–168° C.
2'-trifluoromethyl-4'-fluoro-3,4-dihydro-2-methyl-4-oxo-1,2-benzothiazine-3-carboxanilide 1,1-dioxide, M.P. 213–215° C.
2'-methoxy-5'-methyl-3,4-dihydro-2-methyl-4-oxo-2H-1,2-benzothiazine-3-carboxanilide 1,1-dioxide, M.P. 187–189° C.
4'-thiomethoxy-3,4-dihydro-2-methyl-4-oxo-2H-1,2-benzothiazine-3-carboxanilide 1,1-dioxide, M.P. 239–241° C.
3'-nitro-3,4-dihydro-2-methyl-4-oxo-2H-1,2-benzothiazine-3-carboxanilide 1,1-dioxide, M.P. 281–282° C.
2'-trifluoromethyl-4'-bromo-3,4-dihydro-2-methyl-4-oxo-2H-1,2-benzothiazine-3-carboxanilide 1,1-dioxide M.P. 194–196° C.
2'-bromo-5'-trifluoromethyl-3,4-dihydro-2-methyl-4-oxo-2H-1,2-benzothiazine-3-carboxanilide 1,1-dioxide, M.P. 240–242° C.
3'-trifluoromethyl-4'-bromo-3,4-dihydro-2-methyl-4-oxo-2H-1,2-benzothiazine-3-carboxanilide 1,1-dioxide, M.P. 266–267° C. (dec.).

Example XXIII

The procedure described in Example XXI is employed here to prepare the following 3-carboxamide compounds, starting from the corresponding 3,4-dihydro-4-oxo-2H-1,2-benzothiazine-3-carboxylate 1,1-dioxide reported in Examples XIII–XX and the appropriate organic amine reagent ($R_2NH_2$) in each instance:

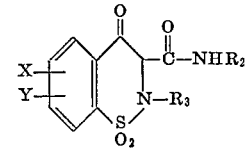

| X | Y | R₂ | R₃ |
|---|---|---|---|
| H | H | n-propyl | n-C₆H₁₃ |
| 6-OC₂H₅ | 7-OC₂H₅ | n-octyl | C₆H₅CH₂ |
| 6-Cl | H | hexylenyl | n-C₃H₇ |
| 6-Cl | 7-Br | cyclooctyl | allyl |
| H | H | C₆H₅(CH₂)₃ | C₂H₅ |
| 5-CH₃ | H | phenyl | C₆H₅(CH₂)₂ |
| 6-OCH₃ | H | o-nitrophenyl | iso-C₃H₇ |
| H | 8-Cl | m-nitrophenyl | C₂H₅ |
| 5-Cl | H | p-nitroph3nyl | methallyl |
| 6-Cl | 7-Cl | α-naphthyl | n-C₄H₉ |
| 6-C₂H₅ | 7-C₂H₅ | β-naphthyl | C₆H₅(CH₂)₃ |
| 5-OC₂H₅ | H | 7-indazolyl | allyl |
| H | 7-OCH₃ | 2-chlorophenyl | iso-C₅H₁₁ |
| 6-Cl | 7-Cl | 3-chlorophenyl | n-C₃H₇ |
| 5-Br | H | 4-chlorophenyl | C₆H₅CH₂ |
| 5-(n-C₄H₉) | H | 2-methylphenyl | methallyl |
| 6-OC₂H₅ | H | 3-methylphenyl | iso-C₃H₇ |
| H | 8-Br | 4-methylphenyl | C₆H₅(CH₂)₂ |
| 6-Cl | H | 2-methoxyphenyl | C₂H₅ |
| 6-Br | H | 3-thiomethoxyphenyl | CH₃ |
| 6-Br | H | 4-methoxyphenyl | allyl |
| 6-CH₃ | 7-CH₃ | 2,5-dichlorophenyl | n-C₄H₉ |
| 6-OCH₃ | 7-OCH₃ | 3,4-dimethylphenyl | C₆H₅CH₂ |
| H | H | 3,4-dichlorophenyl | iso-C₄H₉ |
| H | 8-Cl | 4-(n-butyl)phenyl | CH₃ |
| H | H | 3-CF₃ phenyl | methallyl |
| 5-CH₃ | H | 2,4-dimethoxyphenyl | C₂H₅ |
| H | 8-(n-C₄H₉) | 2,5-dimethoxyphenyl | C₆H₅CH₂ |
| H | H | 2-ethoxyphenyl | iso-C₃H₇ |
| 6-OC₅H₁₁(n) | 7-OC₅H₁₁(n) | 4-ethoxyphenyl | allyl |
| H | H | 3-isopropoxyphenyl | CH₃ |
| 6-F | H | n-propyl | n-C₅H₁₁ |
| H | 5-(n-C₅H₁₁) | n-propyl | C₆H₅(CH₂)₂ |
| 6-OC₅H₁₁(iso) | H | isoamyl | C₂H₅ |
| H | 8-Br | methallyl | n-C₆H₁₃ |
| 5-NO₂ | H | cyclohexyl | methallyl |
| 5-Br | 8-Br | β-phenylethyl | C₂H₅ |
| H | 7-CF₃ | benzyl | CH₃ |
| 6-F | 7-F | 4-bromophenyl | C₆H₅(CH₂)₂ |
| H | H | 4-fluorophenyl | n-C₃H₇ |
| 6-NO₂ | H | 4-CF₃ phenyl | allyl |
| 6-CF₃ | 7-CF₃ | 2,3-dichlorophenyl | C₆H₅CH₂ |
| 6-Cl | H | 5-Cl-2-methoxyphenyl | C₂H₅ |
| 6-Br | 7-Br | 3,5-dichlorophenyl | iso-C₄H₉ |

| X | Y | R₂ | R₃ |
|---|---|---|---|
| 5-CF₃ | H | 3,5-dimethoxyphenyl | C₆H₅CH₂ |
| H | H | 4-thiopropoxyphenyl | n-C₅H₁₁ |
| H | 7-OC₅H₁₁ | 2,6-dimethylphenyl | methallyl |
| 6-(n-C₅H₁₁) | 7-(n-C₅H₁₁) | 2-CH₃O-5-methylphenyl | CH₃ |
| H | 8-NO₂ | 2,4-dimethylphenyl | iso-C₄H₉ |
| H | H | 3-Cl-4-methylphenyl | C₆H₅(CH₂)₂ |
| 6-OCH₃ | 7-OCH₃ | 3-acetylphenyl | n-C₆H₁₃ |
| 5-OCH₃ | H | 2-Cl-5-CF₃ phenyl | C₂H₅ |
| H | 7-F | 3-CH₃SO phenyl | n-C₃H₇ |

Example XXIV

In a 3-liter round-bottomed flask connected to a distilling head and condenser column, there were placed 48.4 g. (0.180 mole) of methyl 3,4-dihydro-2-methyl-4-oxo-2H-1,2-benzothiazine-3-carboxylate 1,1-dioxide, 21.6 g. (0.216 mole) of 2-aminothiazole and 1500 ml. of dry xylene. Nitrogen gas was then bubbled into the red-brown suspension for five minutes, after which time the reaction mixture was heated to begin a period of slow distillation, with complete solution being effected during the first ten minutes of heating. After 5.5 hours, the period of slow distillation was discontinued and the reaction mixture was allowed to heat at reflux for approximately 16 hours. At this point, the slow distillation step was resumed once again, with the solvent being replaced every two hours. After five hours of such further distillation, the reaction mixture was cooled to room temperature and filtered. The brown solid material so obtained in this manner was subsequently air dried for ten minutes and then dissolved in 1700 ml. of boiling chloroform solution to which ca. 100 ml. of methanol had been added. Upon filtering and concentrating the resulting filtrate in vacuo to 1000 ml., there was obtained a white precipitate which was subsequently redissolved by adding 500 ml. of methanol to the solution and boiling for three minutes. On cooling the latter solution slowly in an ice bath, there were then obtained 47.4 g. (78%) of N-(2-thiazolyl)-3,4-dihydro-2-methyl-4-oxo-2H-1,2-benzothiazine-3-carboxamide 1,1-dioxide, as a pale yellow solid melting at 256° C. (dec.).

*Analysis.*—Calcd. for $C_{13}H_{11}N_3O_4S$ (percent): C, 46.29; H, 3.29; N, 12.45; S, 1901. Found (percent): C, 46.36; H, 3.46; N, 12.54; S, 19.03.

Example XXV

The procedure described in Example XXIV was repeated again, only this time to prepare the following N-heterocyclic 3,4-dihydro-2-methyl-4-oxo-2H-1,2-benzothiazine-3-carboxamide 1,1-dioxides starting from methyl 3,4-dihydro-2-methyl-4-oxo-2H-1,2-benzothiazine-3-carboxylate 1,1-dioxide and the appropriate heterocyclic amine reagent in each case:

N-(2-benzothiazolyl)-3,4-dihydro-2-methyl-4-oxo-2H-1,2-benzothiazine-3-carboxamide 1,1-dioxide, M.P. 234–237° C.

N-(2-pyrazinyl)-3,4-dihydro-2-methyl-4-oxo-2H-1,2-benzothiazine-3-carboxamide 1,1-dioxide, M.P. 257–258° C. (dec.)

N-(2-pyrimidyl)-3,4-dihydro-2-methyl-4-oxo-2H-1,2-benzothiazine-3-carboxamide, 1,1-dioxide, M.P. 133–135° C. (dec.)

N-(2-pyridyl)-3,4-dihydro-2-methyl-4-oxo-2H-1,2-benzothiazine-3-carboxamide 1,1-dioxide, M.P. 197–200° C.

N-(4-methyl-2-thiazolyl)-3,4-dihydro-2-methyl-4-oxo-2H-1,2-benzothiazine-3-carboxamide 1,1-dioxide, M.P. 245–247° C. (dec.)

N-[3-(1,2,4-triazinyl)]-3,4-dihydro-2-methyl-4-oxo-2H-1,2-benzothiazine-3-carboxamide 1,1-dioxide, M.P. 199–201° C. (dec.)

N-(6-methoxy-3-pyridazinyl)-3,4-dihydro-2-methyl-4-oxo-2H-1,2-benzothiazine-3carboxamide 1,1dioxide, M.P. 210–212° C. (dec.)

[N-2-(5-methyl-1,3,4-thiadiazinyl)]-3,4-dihydro-2-methyl-4-oxo-2H-1,2-benzothiazine3-carboxamide 1, 1-dioxide, M.P. 274–276° C. (dec.)

N-(5-chloro-2-benzoxazolyl)-3,4-dihydro-2-methyl-4-oxo-2H-1,2-benzothiazine-3-carboxamide 1,1-dioxide- M.P. 229–234° C. (dec.)

N-(4,5-dimethyl-2-pyrimidyl)-3,4-dihydro-2-methyl-4-oxo-2H-1,2-benzothiazine-3carboxamide 1,1-dioxide, M.P. 211° C. (dec.)

N-(4-phenyl-2-thiazolyl)-3,4-dihydro-2-methyl-4-oxo-2H-1,2-benzothiazine-3-carboxamide 1,1-dioxide, M.P. 277° C. (dec.)

N-(1-phenyl-3-pyrazolonyl-5)-3,4-dihydro-2-methyl-4-oxo-2H-1,2-benzothiazine-3-carboxamide 1,1-dioxide, M.P. 251–253° C. (dec.)

N-(3-hydroxy-2-pyridyl)-3,4-dihydro-2-methyl-4-oxo-1,2-benzothiazine-3-carboxamide 1,1-dioxide, M.P. 264–265° C. (dec.)

N-[2-(1,3,4-thiadazolyl)]-3,4-dihydro-2-methyl-4-oxo-1,2-benzothiazine-3-carboxamide 1,1-dioxide, M.P. 257° C. (dec.)

N-[3-(6-phenyl-1,2,4-triazolyl)]-3,4-dihydro-2-methyl-4-oxo-1,2,-benzothiazine-3-carboxamide 1,1-dioxide, M.P. 275–277° S. (dec.)

N-(5-bromo-2-thiazolyl)-3,4-dihydro-2-methyl-4-oxo-2H-1,2-benzothiazine-3-carboxamide 1,1-dioxide, M.P. 216–218° C. (dec.)

N-(5-carboxamido-2-pyridyl)-3,4-dihydro-2-methyl-4-oxo-2H-1,2-benzothiazine-3-carboxamide 1,1-dioxide, M.P. 275–277° C. (dec.)

N-(4,5-dimethyl-2-thiazolyl)-3,4-dihydro-2-methyl-4-oxo-2H-1,2-benzothiazine-3-carboxamide 1,1-dioxide, M.P. 233–234° C. (dec.)

N-(4-chloro-2-benzothiazolyl)-3,4-dihydro-2-methyl-4-oxo-2H-1,2-benzothiazine-3-carboxamide 1,1-dioxide, M.P. 315° C. (dec.)

N-(6-methyl-2-benzothiazolyl)-3,4-dihydro-2-methyl-4-oxo-2H-1,2-benzothiazine-3-carboxamide 1,1-dioxide, M.P. 257° C. (dec.)

N-(6-bromo-2-benzothiazolyl)-3,4-dihydro-2-methyl-4-oxo-2H-1,2-benzothiazine-3-carboxamide 1,1-dioxide, M.P. 305° C. (dec.)

N-(5-bromo-2-pyridyl)-3,4-dihydro-2-methyl-4-oxo-2H-1,2-benzothiazine-3-carboxamide 1,1-dioxide, M.P. 267° C. (dec.)

N-(5-chloro-2-pyridyl)-3,4-dihydro-2-methyl-4-oxo-2H-1,2-benzothiazine-3-carboxamide 1,1-dioxide, M.P. 261–263° C. (dec.)

N-(4,6-dimethyl-2-pyridyl)-3,4-dihydro-2-methyl-4-oxo-2H-1,2-benzothiazine-3-carboxamide 1,1-dioxide, M.P. 198° C. (dec.)

N-(5-nitro-2-pyridyl)-3,4-dihydro-2-methyl-4-oxo-2H-1,2-benzothiazine-3-carboxamide 1,1-dioxide, M.P. 272° C. (dec.)

N-(5-methyl-2-pyridyl)-3,4-dihydro-2-methyl-4-oxo-2H-1,2-benzothiazine-3-carboxamide 1,1-dioxide, M.P. 235° C. (dec.)

N-(6-methyl-2-pyridyl)-3,4-dihydro-2-methyl-4-oxo-2H-1,2-benzothiazine-3-carboxamide, 1,1-dioxide, M.P. 189–191° C.

N-(4-methyl-2-pyridyl)-3,4-dihydro-2-methyl-4-oxo-2H-1,2-benzothiazine-3-carboxamide 1,1-dioxide, M.P. 243–245° C. (dec.)

N-(3-methyl-2-pyridyl)-3,4-dihydro-2-methyl-4-oxo-2H-1,2-benzothiazine-3-carboxamide 1,1-dioxide, M.P. 278° C. (dec.)

N-(3-pyridyl)-3,4-dihydro-2-methyl-4-oxo-2H-1,2-benzothiazine-3-carboxamide 1,1-dioxide, M.P. 243° C. (dec.)

N-(4-pyridyl)-3,4-dihydro-2-methyl-4-oxo-2H-1,2-benzothiazine-3-carboxamide 1,1-dioxide, M.P. 254° C. (dec.)

Example XXVI

The procedure described in Example XXIV is employed here to prepare the following N-heterocyclic 3-carboxamide compounds, starting from the corresponding 3,4-dihydro-4-oxo-2H-1,2-benzothiazine-3-carboxylate 1,1-dioxide reported in Examples XIII–XX and the appropriate organic amine reagent ($R_2NH_2$) in each case:

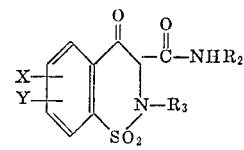

| X | Y | $R_2$ | $R_3$ |
|---|---|---|---|
| H | H | pyridyl (2 or α-) | n-$C_6H_{13}$ |
| 6-$OC_2H_5$ | 7-$OC_2H_5$ | 3-methyl-2-pyridyl | $C_6H_5CH_2$ |
| 6-Cl | H | 4-methyl-2-pyridyl | n-$C_3H_7$ |
| 6-Cl | 7-Br | 5-methyl-2-pyridyl | allyl |
| H | H | 6-methyl-2-pyridyl | $C_2H_5$ |
| 5-$CH_3$ | H | 4,6-dimethyl-2-pyridyl | $C_6H_5(CH_2)_2$ |
| 6-$OCH_3$ | H | 5-chloro-2-pyridyl | iso-$C_3H_7$ |
| H | 8-Cl | 5-bromo-2-pyridyl | $C_2H_5$ |
| 5-Cl | H | 5-nitro-2-pyridyl | methallyl |
| 6-Cl | 7-Cl | 3-hydroxy-2-pyridyl | n-$C_4H_9$ |
| 6-$C_2H_5$ | 7-$C_2H_5$ | 5-carboxamido-2-pyridyl | $C_6H_5(CH_2)_3$ |
| 5-$OC_2H_5$ | H | 2-pyrazinyl | allyl |
| H | 7-$OCH_3$ | 2-pyrimidyl | iso-$C_5H_{11}$ |
| 6-Cl | 7-Cl | 4,5-dimethyl-2-pyrimidyl | n-$C_3H_7$ |
| 5-Br | H | 4-pyrimidyl | $C_6H_5CH_2$ |
| 5-(n-$C_4H_9$) | H | 5-methyl-3-pyridazinyl | methallyl |
| 6-$OC_2H_5$ | H | 6-methoxy-3-pyridazinyl | iso-$C_3H_7$ |
| H | 8-Br | 1-phenyl-3-pyrazolonyl | $C_6H_5(CH_2)_2$ |
| 6-Cl | H | 2-thiazolyl | $C_2H_5$ |
| H | H | 4-methyl-2-thiazolyl | $CH_3$ |
| 6-Br | H | 4-phenyl-2-thiazolyl | allyl |
| 6-$CH_3$ | 7-$CH_3$ | 5-bromo-2-thiazolyl | n-$C_4H_9$ |
| 6-$OCH_3$ | 7-$OCH_3$ | 3-isothiazolyl | $C_6H_5CH_2$ |
| H | H | 4,5-dimethyl-2-thiazolyl | iso-$C_4H_9$ |
| H | 8-Cl | 2-benzothiazolyl | $CH_3$ |
| H | H | 6-methyl-2-benzothiazolyl | methallyl |
| 5-$CH_3$ | H | 4-chloro-2-benzothiazolyl | $C_2H_5$ |
| H | 8-(n-$C_4H_9$) | 6-bromo-2-benzothiazolyl | $C_6H_5CH_2$ |
| H | H | 5-chloro-2-benzoxazolyl | iso-$C_3H_7$ |
| 6-$OC_5H_{11}$(n) | 7-$OC_5H_{11}$(n) | 1,3,4-thiadiazolyl | allyl |
| H | H | 5-methyl-1,3,4-thiadiazolyl | $CH_3$ |
| 6-F | H | 1,2,4-triazolyl | n-$C_5H_{11}$ |
| 5-(n-$C_5H_{11}$) | H | 6-phenyl-1,2,4-triazolyl | $C_6H_5(CH_2)_2$ |
| 6-$OC_5H_{11}$(iso) | H | pyridyl (2 or α-) | $C_2H_5$ |
| H | 8-Br | 3-methyl-2-pyridyl | n-$C_6H_{13}$ |
| 5-$NO_2$ | H | 4-methyl-2-pyridyl | methallyl |
| 5-Br | 8-Br | 5-methyl-2-pyridyl | $C_2H_5$ |
| H | 7-$CF_3$ | 6-methyl-2-pyridyl | $CH_3$ |
| 6-F | 7-F | 4,6-dimethyl-2-pyridyl | $C_6H_5(CH_2)_2$ |
| H | 7-F | 4,6-dimethyl-2-pyridyl | $C_6H_5(CH_2)_2$ |
| H | H | 5-chloro-2-pyridyl | n-$C_3H_7$ |
| 6-$NO_2$ | H | 5-bromo-2-pyridyl | allyl |
| 6-$CF_3$ | 7-$CF_3$ | 5-nitro-2-pyridyl | $C_6H_5CH_2$ |
| 6-Cl | H | 3-hydroxy-2-pyridyl | $C_2H_5$ |
| 6-Br | 7-Br | 5-carboxamido-2-pyridyl | iso-$C_4H_9$ |
| 5-$CF_3$ | H | 2-pyrazinyl | $C_6H_5CH_2$ |
| H | H | 2-pyrazinyl | n-$C_5H_{11}$ |
| H | 7-$OC_5H_{11}$ | 4,5-dimethyl-2-pyrimidyl | methallyl |
| 6-(n-$C_5H_{11}$) | 7-(n-$C_5H_{11}$) | 4-pyrimidyl | $CH_3$ |
| H | 8-$NO_2$ | 5-methyl-3-pyridazinyl | iso-$C_4H_9$ |
| H | H | 6-methoxy-3-pyridazinyl | $C_6H_5(CH_2)_2$ |
| 6-$OCH_3$ | 7-$OCH_3$ | 1-phenyl-3-pyrazolonyl | n-$C_6H_{13}$ |
| 5-$OCH_3$ | H | 2-thiazolyl | $C_2H_5$ |
| H | 7-F | 4-methyl-2-thiazolyl | n-$C_3H_7$ |
| H | H | 4-phenyl-2-thiazolyl | N-$C_6H_{13}$ |
| 6-$OC_2H_5$ | 7-$OC_2H_5$ | 5-bromo-2-thiazolyl | $C_6H_5CH_2$ |
| 6-Cl | H | 3-isothiazolyl | n-$C_3H_7$ |
| 6-Cl | 7-Br | 4,5-dimethyl-2-thiazolyl | allyl |
| H | H | 2-benzothiazolyl | $C_2H_5$ |
| 5-$CH_3$ | H | 6-methyl-2-benzothiazolyl | $C_6H_5(CH_2)_2$ |
| 6-$OCH_3$ | H | 4-chloro-2-benzothiazolyl | iso-$C_3H_7$ |
| H | 8-Cl | 6-bromo-2-benzothiazolyl | $C_2H_5$ |
| 5-Cl | H | 5-chloro-2-benzoxazolyl | methallyl |
| 6-Cl | 7-Cl | 1,3,4-thiadiazolyl | n-$C_4H_9$ |
| 6-$C_2H_5$ | 7-$C_2H_5$ | 5-methyl-1,3,4-thiadiazolyl | $C_6H_5(CH_2)_3$ |
| 5-$OC_2H_5$ | H | 1,2,4-triazolyl | allyl |
| H | 7-$OCH_3$ | 6-phenyl-1,2,4-triazolyl | iso-$C_5H_{11}$ |

Example XXVII

In a round-bottom flask under a drying tube, there were placed 4.0 g. (0.011 mole) of 2'-chloro-3,4-dihydro-2-methyl - 3 - oxo - 2H - 1,2 - benzothiazone - 4 - carboxanilide 1,1-dioxide (prepared as described in Example VII) dissolved in 75 ml. of absolute ethanol. The resulting reaction solution was refluxed for 24 hours, and then slowly evaporated to dryness while under reduced pressure. In this manner, there was obtained a yellow oil that was subsequently partitioned between diethyl ether and 6 N hydrochloric acid. The separated ether layer was washed again with 6 N hydrochloric acid and then once with water, followed by drying over anhydrous calcium sulfate. After removal of the drying agent by means of filtration and the ethereal solvent by means of evaporation under reduced pressure, there was obtained 1.9 g. of ethyl 3,4-dihydro - 2 - methyl - 3 - oxo - 2H - 1,2 - benzothiazone - 4 - carboxylate 1,1 - dioxide in the form of a soft yellow solid, M.P. 68–70° C. The analytical sample was triturated with diethyl ether-hexane and then vacuum dried at room temperature (25° C.) for four hours.

*Analysis.*—Calcd. for $C_{12}H_{13}NO_5S$ (percent): C, 50.90; H, 4.63; N, 4.96. Found (percent): C, 50.89; H, 5.08; N, 4.96.

Example XXVIII

The procedure described in Example XXVII is employed again to prepare the following 4-carboxylates, starting from the corresponding 2'-chloro-3,4-dihydro-3-oxo - 2H - 1,2 - benzothiazine - 4 - carboxanilide 1,1-dioxide and appropriate alcohol ($R_1OH$) reagent in each instance:

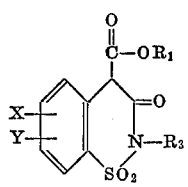

| X | Y | $R_1$ | $R_3$ |
|---|---|---|---|
| H | H | $C_2H_5$ | $n\text{-}C_6H_{13}$ |
| 6-OC$_2$H$_5$ | 7-OC$_2$H$_5$ | n-C$_3$H$_7$ | C$_6$H$_5$CH$_2$ |
| 6-Cl | H | iso-C$_3$H$_7$ | n-C$_3$H$_7$ |
| 6-Cl | 7-Br | n-C$_4$H$_9$ | allyl |
| H | H | tert-C$_4$H$_9$ | C$_2$H$_5$ |
| 5-CH$_3$ | H | n-C$_5$H$_{11}$ | C$_6$H$_5$(CH$_2$)$_2$ |
| 6-OCH$_3$ | H | iso-C$_5$H$_{11}$ | iso-C$_3$H$_7$ |
| H | 8-Cl | n-C$_6$H$_{13}$ | C$_2$H$_5$ |
| 5-Cl | H | n-C$_7$H$_{15}$ | methallyl |
| 6-Cl | 7-Cl | n-C$_8$H$_{17}$ | n-C$_4$H$_9$ |
| 6-C$_2$H$_5$ | 7-C$_2$H$_5$ | n-C$_9$H$_{19}$ | C$_6$H$_5$(CH$_2$)$_3$ |
| 5-OC$_2$H$_5$ | H | n-C$_{10}$H$_{21}$ | allyl |
| H | 7-OCH$_3$ | n-C$_{12}$H$_{25}$ | iso-C$_5$H$_{11}$ |
| 6-Cl | 7-Cl | C$_6$H$_5$CH$_2$ | n-C$_3$H$_7$ |
| 5-Br | H | C$_6$H$_5$(CH$_2$)$_2$ | C$_6$H$_5$CH$_2$ |
| 5-(n-C$_9$H$_9$) | H | C$_6$H$_5$(CH$_2$)$_3$ | methallyl |
| 6-OC$_2$H$_5$ | H | CH$_3$ | iso-C$_3$H$_7$ |
| H | 8-Br | C$_2$H$_5$ | C$_6$H$_5$(CH$_2$)$_2$ |
| 6-Cl | H | n-C$_3$H$_7$ | C$_2$H$_5$ |
| H | H | iso-C$_3$H$_7$ | CH$_3$ |
| 6-Br | H | n-C$_4$H$_9$ | allyl |
| 6-CH$_3$ | 7-CH$_3$ | iso-C$_4$H$_9$ | n-C$_4$H$_9$ |
| 6-OCH$_3$ | 7-OCH$_3$ | n-C$_5$H$_{11}$ | C$_6$H$_5$CH$_2$ |
| H | H | iso-C$_5$H$_{11}$ | iso-C$_4$H$_9$ |
| H | 8-Cl | n-C$_7$H$_{15}$ | CH$_3$ |
| H | H | n-C$_8$H$_{17}$ | methallyl |
| 5-CH$_3$ | H | n-C$_9$H$_{19}$ | C$_2$H$_5$ |
| H | 8-(n-C$_4$H$_9$) | n-C$_{11}$H$_{21}$ | C$_6$H$_5$CH$_2$ |
| H | H | n-C$_{12}$H$_{25}$ | iso-C$_3$H$_7$ |
| 6-OC$_5$H$_{11}$(n) | 7-OC$_5$H$_{11}$(n) | C$_6$H$_5$CH$_2$ | allyl |
| H | H | C$_6$H$_5$(CH$_2$)$_2$ | CH$_3$ |
| 6-F | H | C$_6$H$_5$(CH$_2$)$_3$ | n-C$_5$H$_{11}$ |
| 5-(n-C$_5$H$_{11}$) | H | CH$_3$ | C$_6$H$_5$(CH$_2$)$_2$ |
| 6-OC$_5$H$_{11}$ (iso) | H | C$_2$H$_5$ | C$_2$H$_5$ |
| H | 8-Br | n-C$_3$H$_7$ | n-C$_6$H$_{13}$ |
| 5-NO$_2$ | H | iso-C$_3$H$_7$ | methallyl |
| 5-Br | 8-Br | n-C$_4$H$_9$ | C$_2$H$_5$ |
| H | 7-CF$_3$ | iso-C$_4$H$_9$ | CH$_3$ |
| 6-F | 7-F | tert-C$_4$H$_9$ | C$_6$H$_5$(CH$_2$)$_2$ |
| H | H | n-C$_5$H$_{11}$ | n-C$_3$H$_7$ |
| 6-NO$_2$ | H | iso-C$_5$H$_{11}$ | allyl |
| 6-CF$_3$ | 7-CF$_3$ | n-C$_6$H$_{13}$ | C$_6$H$_5$CH$_2$ |
| 6-Cl | H | n-C$_9$H$_{13}$ | C$_2$H$_5$ |
| 6-Br | 7-Br | n-C$_8$H$_{11}$ | iso-C$_4$H$_9$ |
| 5-CF$_3$ | H | n-C$_9$H$_{19}$ | C$_6$H$_5$CH$_2$ |
| H | H | n-C$_{10}$H$_{21}$ | n-C$_5$H$_{11}$ |
| H | 7-OC$_5$H$_{11}$ | n-C$_{11}$H$_{23}$ | methallyl |
| 6-(n-C$_5$H$_{11}$) | 7-(n-C$_5$H$_{11}$) | n-C$_{12}$H$_{25}$ | CH$_3$ |
| H | 8-NO$_2$ | C$_6$H$_5$CH$_2$ | iso-C$_4$H$_9$ |
| H | H | C$_6$H$_5$(CH$_2$)$_3$ | C$_6$H$_5$(CH$_2$)$_2$ |
| 6-OCH$_3$ | 7-OCH$_3$ | n-C$_4$H$_9$ | n-C$_6$H$_{13}$ |
| 5-OCH$_3$ | H | CH$_3$ | C$_2$H$_5$ |
| H | 7-F | C$_2$H$_5$ | n-C$_3$H$_7$ |

Example XXIX

In a round-bottom flask under a dry nitrogen atmosphere, there were placed 2.0 g. (0.0071 mole) of ethyl 3,4 - dihydro - 2 - methyl - 3 - oxo - 2H - 1,2-benzothiazine - 4 - carboxylate 1,1-dioxide and 0.86 g. (0.008 mole) of benzylamine in 125 ml. of dry xylene. Nitrogen gas was then bubbled into the mixture for approximately five minutes, followed by a reflux period of two hours. At this point, the reaction solution was subjected to a period of slow distillation, whereby 75 ml. of distillate was subjected to a period of slow distillation, whereby 75 ml. of distillate was ultimately collected during the course of one-half hour. Upon the addition of 75 ml. of dry xylene to the residual liquid and continued slow distillation for another hour, there was obtained 75 ml. of additional distillate. The residual liquid was then further concentrated under a high vacuum to yield a viscous, brown oil that was subsequently dissolved in 25 ml. of ethanol. On cooling the latter solution in a refrigerator overnight for approximately 16 hours, there was obtained a 600 mg. (25%) yield of N-benzyl-3,4-dihydro - 2 - methyl - 3 - oxo - 2H - 1,2 - benzothiazine-4-carboxamide 1,1-dioxide in the form of fluffy-white crystals, M.P. 147–149° C. after further recrystallization from boiling ethanol.

*Analysis.*—Calcd. for $C_{17}H_{16}N_2O_4S$ (percent): C, 59.28; H, 4.68; N, 8.14. Found (percent): C, 58.87; H, 4.47; N, 8.11.

Example XXX

The procedure described in the preceding example was used to prepare the following 3,4 - dihydro - 2 - methyl-3 - oxo - 2H - 1,2 - benzothiazine - 4 - carboxamide 1,1-dioxide compounds, starting from ethyl 3,4-dihydro-2-methyl - 3 - oxo - 2H - 1,2 - benzothiazine - 4 - carboxylate 1,1-dioxide and an equivalent amount of the appropriate amine base in each instance:

2',4'-dimethoxy-3,4-dihydro-2-methyl-3-oxo-2H-1,2-
 benzothiazine-4-carboxanilide 1,1-dioxide,
 M.P. 171–174° C.

4'-thiomethoxy-3,4-dihydro-2-methyl-3-oxo-2H-1,2-
 benzothiazine-4-carboxanilide 1,1-dioxide,
 M.P. 189–192° C.

3'-chloro-4'-methyl-3,4-dihydro-2-methyl-3-oxo-2H-1,2-
 benzothiazine-4-carboxanilide 1,1-dioxide,
 M.P. 180–184° C.

4'-iodo-3,4-dihydro-2-methyl-3-oxo-2H-1,2-benzo-
 thiazine-4-carboxanilide 1,1-dioxide, M.P.
 164–167° C.

4'-(n-butyl)-3,4-dihydro-2-methyl-3-oxo-2H-1,2-
 benzothiazine-4-carboxanilide 1,1-dioxide,
 M.P. 172–175° C.

N-(n-amyl)-3,4-dihydro-2-methyl-3-oxo-2H-1,2-
 benzothiazine-4-carboxamide, 1,1-dioxide,
 M.P. 86–89° C.

N-cyclohexyl-3,4-dihydro-2-methyl-3-oxo-2H-1,2-
 benzothiazine-4-carboxamide, 1,1-dioxide,
 M.P. 170–173° C.

N-(β-phenylethyl)-3,4-dihydro-2-methyl-3-oxo-2H-1,2-benzothiazine-4-carboxamide, 1,1-dioxide, M.P. 180–183° C.

Example XXXI

The procedure described in Example XXIX is employed here to prepare the following 4-carboxamide compounds, starting from the corresponding 3,4-dihydro-3-oxo-2H-1,2-benzothiazine-4-carboxylate 1,1-dioxide (reported in Examples XXVII–XXVIII) and the appropriate organic amine reagent ($R_2NH_2$) in each case:

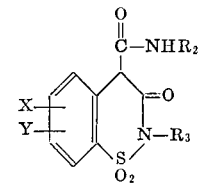

| X | Y | $R_2$ | $R_3$ |
|---|---|---|---|
| H | H | n-propyl | n-$C_6H_{13}$ |
| 6-$OC_2H_5$ | 7-$OC_2H_5$ | n-octyl | $C_6H_5CH_2$ |
| 6-Cl | H | hexylenyl | n-$C_3H_7$ |
| 6-Cl | 7-Br | cyclooctyl | allyl |
| H | H | $C_6H_5(CH_2)_3$ | $C_2H_5$ |
| 5-$CH_3$ | H | phenyl | $C_6H_5(CH_2)_2$ |
| 6-$OCH_3$ | H | o-nitrophenyl | iso-$C_3H_7$ |
| H | 8-Cl | m-nitrophenyl | $C_2H_5$ |
| 5-Cl | H | p-nitrophenyl | methallyl |
| 6-Cl | 7-Cl | α-naphthyl | n-$C_4H_9$ |
| 6-$C_2H_5$ | 7-$C_2H_5$ | β-naphthyl | $C_6H_5(CH_2)_3$ |
| 5-$OC_2H_5$ | H | 7-indazolyl | allyl |
| H | 7-$OCH_3$ | 2-chlorophenyl | iso-$C_5H_{11}$ |
| 6-Cl | 7-Cl | 3-chlorophenyl | n-$C_3H_7$ |
| 5-Br | H | 4-chlorophenyl | $C_6H_5CH_2$ |
| 5-n-$C_4H_9$) | H | 2-methylphenyl | methallyl |
| 6-$OC_2H_5$ | H | 3-methylphenyl | iso-$C_3H_7$ |
| 6-Br | 7-Br | 3,5-dichlorophenyl | iso-$C_4H_9$ |
| 5-$CF_3$ | H | 3,5-dimethoxyphenyl | $C_6H_5CH_2$ |
| H | H | 4-thiopropoxyphenyl | n-$C_5H_{11}$ |
| H | 7-$OC_5H_{11}$ | 2,6-dimethylphenyl | methyallyl |
| 6-(n-$C_5H_{11}$) | 7-(n-$C_5H_{11}$) | 2-$CH_3O$-5-methlphenyl | $CH_3$ |
| H | 8-$NO_2$ | 2,4-dimethylphenyl | n-$C_4H_9$ |
| H | H | 3-cl-4-methylphenyl | $C_6H_5(CH_2)_2$ |
| 6-$OCH_3$ | 7-$OCH_3$ | 3-acetylphenyl | n-$C_6H_{13}$ |
| 5-$OCH_3$ | H | 2-Cl-5-$CF_3$ phenyl | $C_2H_5$ |
| H | 7-F | 3-$CH_3SO$ phenyl | n-$C_3H_7$ |
| H | H | 2-pyridyl | n-$C_6H_{13}$ |
| 6-$OC_2H_5$ | 7-$OC_2H_5$ | 3-methyl-2-pyridyl | $C_6H_5CH_2$ |
| 6-Cl | H | 4-methyl-2-pyridpl | n-$C_3H_7$ |
| 6-Cl | 7-Br | 5-methyl-2-pyridyl | allyl |
| H | H | 6-methyl-2-pyridyl | $C_2H_5$ |
| 5-$CH_3$ | H | 4,6-dimethyl2-pyridyl | $C_6H_5(CH_2)_2$ |
| 6-$OCH_3$ | H | 5-chloro-2-pyridyl | iso-$C_3H_7$ |
| H | 8-Cl | 5-bromo-2-pyridyl | $C_2H_5$ |
| 5-Cl | H | 5-nitro-2-pyridyl | methallyl |
| 6-Cl | 7-Cl | 3-hydroxy-2-pyridyl | n-$C_4H_9$ |
| 6-$C_2H_5$ | 7-$C_2H_5$ | 5-carboxamido-2-pyridyl | $C_6H_5(CH_2)_3$ |
| 5-$OC_2H_5$ | H | 2-pyrazinyl | allyl |
| H | 7-$OCH_3$ | 2-pyrimidyl | iso-$C_5H_{11}$ |
| 6-Cl | 7-Cl | 4,5-dimethyl-2-pyrimidyl | n-$C_3H_7$ |
| 5-Br | H | 4-pyrimidyl | $C_6H_5CH_2$ |
| H | 8-Br | 4-methylphenyl | $C_6H_5(CH_2)_2$ |
| 6-Cl | H | 2-methoxyphenyl | $C_2H_5$ |
| H | H | 3-thiomethoxyphenyl | $CH_3$ |
| 6-Br | H | 4-methoxyphenyl | allyl |
| 6-$CH_3$ | 7-$CH_3$ | 2,5-dichlorophenyl | n-$C_4H_9$ |
| 6-$OCH_3$ | 7-$OCH_3$ | 3,4-dimethylphenyl | $C_6H_5CH_2$ |
| H | H | 3,4-dichlorophenyl | iso-$C_4H_9$ |
| H | 8-Cl | 4-(n-butyl)phenyl | $CH_3$ |
| H | H | 3-$CF_3$ phenyl | methallyl |
| 5-$CH_3$ | H | 2,4-dimethoxyphenyl | $C_2H_5$ |
| H | 8-(n-$C_4H_9$) | 2,5-dimethoxyphenyl | $C_6H_5CH_2$ |
| H | H | 2-ethoxyphenyl | iso-$C_3H_7$ |
| 6-$OC_5H_{11}(n)$ | 7-$OC_5H_{11}(n)$ | 4-ethoxyphenyl | allyl |
| H | H | 3-isopropoxyphenyl | $CH_3$ |
| 6-F | H | hydrogen | n-$C_5H_{11}$ |
| 5-(n-$C_5H_{11}$) | H | n-propyl | $C_6H_5(CH_2)_2$ |
| 6-$OC_5H_{11}$(iso) | H | isoamyl | $C_2H_5$ |
| H | 8-Br | methallyl | n-$C_6H_{13}$ |
| 5-$NO_2$ | H | cyclohexyl | methallyl |
| 5-Br | 8-Br | β-phenylethyl | $C_2H_5$ |
| H | 7-$CF_3$ | benzyl | $CH_3$ |
| 6-F | 7-F | 4-bromophenyl | $C_6H_5(CH_2)_2$ |
| H | H | 4-fluorophenyl | n-$C_3H_7$ |
| 6-$NO_2$ | H | 4-$CF_3$ phenyl | allyl |
| 6-$CF_3$ | 7-$CF_3$ | 2,3-dichlorophenyl | $C_6H_5CH_2$ |
| 6-Cl | H | 5-Cl-2-methoxyphenyl | $C_2H_5$ |
| 5-(n-$C_4H_9$) | H | 5-methyl-3-pyridazinyl | methallyl |
| 6-$OC_2H_5$ | H | 6-methoxy-3-pyridazinyl | iso-$C_3H_7$ |
| H | 8-Br | 1-phenyl-3-pyrazolonyl | $C_6H_5(CH_2)_2$ |
| 6-Cl | H | 2-thiazolyl | $C_2H_5$ |
| H | H | 4-methyl-2-thiazolyl | $CH_3$ |
| 6-Br | H | 4-phenyl-2-thiazolyl | allyl |
| 6-$CH_3$ | 7-$CH_3$ | 5-bromo-2-thiazolyl | n-$C_4H_9$ |
| 6-$OCH_3$ | 7-$OCH_3$ | 3-isothiazolyl | $C_6H_5CH_2$ |
| H | H | 4,5-dimethyl-2-thiazolyl | iso-$C_4H_9$ |
| H | 8-Cl | 2-benzothiazolyl | $CH_3$ |
| H | H | 6-methyl-2-benzothiazolyl | methallyl |
| 5-$CH_3$ | H | 4-chloro-2-benzothiazolyl | $C_2H_5$ |
| H | H | 6-bromo-2-benzothiazolyl | $C_6H_5CH_2$ |
| H | 8-(n-$C_4H_9$) | 5-chloro-2-benzoxazolyl | iso-$C_3H_7$ |
| 6-$OC_5H_{11}(n)$ | 7-$OC_5H_{11}(n)$ | 1,3,4-thiadiazolyl | allyl |
| H | H | 5-methyl-1,3,4-thiadiazolyl | $CH_3$ |
| 6-F | H | 1,2,4-triazolyl | n-$C_5H_{11}$ |
| 5-(n-$C_5H_{11}$) | H | 6-phenyl-1,2,4-triazolyl | $C_6H_5(CH_2)_2$ |

Example XXXII

In a three-necked round-bottomed flask equipped with stirrer, dropping funnel and drying tube, there was placed 0.75 g. (0.0020) of 4'-thiomethoxy-3,4-dihydro-2-methyl-3-oxo-2H-1,2-benzothiazine-4-carboxanilide 1,1 - dioxide (prepared in Example XXX) dissolved in 20 ml. of glacial acetic acid. Stirring was commenced and to the resulting white suspension, there was then added in a dropwise manner 0.25 g. (0.0022 mole) of 30% hydrogen peroxide. The reaction mixture which formed was stirred at room temperature ($\sim$25° C.) for ten minutes and then heated in a water-bath at 45–50° C. for an additional two hours. Upon completion of this step, the resulting mixture was poured into ca. 100 ml. of ice-water and stirred for approximately ten minutes in an ice bath. The precipitated white solids were then subsequently collected on a filter funnel and washed well with cold water to afford, after vacuum drying, 570 mg. (76%) of 4'-methylsulfinyl-3,4-dihydro - 2 - methyl - 3-oxo-2H-1,2-benzothiazine-4-carboxanilide 1,1 - dioxide, M.P. 152–156° C. (dec.).

Example XXXIII

The procedure described in Example XXXII is repeated to prepare other methylsulfinyl 3,4-dihydro-3(4)-oxo-2H-2-benzothiazine-4(3) - carboxanilide 1,1-dioxides of this invention by merely substituting the appropriate methylthio substrate (reported elsewhere in the previous examples) in place of 4'-thiomethoxy-3,4-dihydro-2-methyl-3-oxo-2H-1,2-benzothiazine-4-carboxanilide 1,1 - dioxide on the same molar basis as before. For instance, when 0.75 g. (0.0020 mole) of 3'-thiomethoxy-3,4-dihydro-2-methyl-4-oxo-2H-1,2 - benzothiazine - 3 - carboxanilide 1,1-dioxide in 20 ml. of glacial acetic acid is subjected to this very same procedure (i.e., reaction with 0.0022 mole of 30% $H_2O_2$, etc.), the corresponding product obtained is 3'-methylsulfinyl - 3,4 - dihydro - 2-methyl-4-oxo-2H-1,2-benzothiazine-3-carboxanilide 1,1 - dioxide. In like manner, the other methylsulfinyl compounds are each similarly prepared.

Example XXXIV

In a Parr hydrogenator apparatus, there were placed 1.5 g. (0.0034 mole) of 3'-chloro-3,4-dihydro-2-benzyl-4-oxo-2H-1,2-benzothiazine-3-carboxanilide 1,1 - dioxide (prepared in Example XXIII), 1.0 g. of palladium-on-carbon (10%) catalyst and 200 ml. of a 2:1 by volume mixture of chloroform-methanol. (The aforementioned 2-benzyl compound had previously been dissolved in the solvent mixture before adding the catalyst.) After shaking the entire system on the hydrogenator for a period of two hours while at room temperature ($\sim$25° C.), the operation was interrupted to replace used catalyst. This was done by first removing the old catalyst from the system by means of filtration and then adding 1.0 g. of fresh palladium-on-carbon to the resulting clear filtrate. Shaking on the hydrogenator was then resumed and after an additional two hours had elapsed, no further hydrogen uptake could be observed and the reaction was adjusted complete. At this point, the system was again disconnected, the catalyst removed by means of filtration and the filtrate was subsequently evaporated to dryness while under reduced pressure to afford a white crystalline solid. After drying the latter material to constant weight in a desiccator, there was obtained 772 mg. (64%) of 3'-chloro-3,4' - dihydro - 4 - oxo-2H-1,2-benzothiazine-3-carboxanilide 1,1-dioxide, M.P. 217–218° C. (dec.).

*Analysis.*—Calcd. for $C_{15}H_{11}ClN_2O_4$ (percent): C, 51.36; H, 3.2; N, 8.0. Found (percent): C, 51.86; H, 3.41; N, 8.03.

Example XXXV

The procedure described in Example XXXIV is repeated to prepare other 3,4-dihydro-2H-1,2-benzothiazine 1,1-dioxides of this invention which also lack a substituent group at the 3-position of the molecule, i.e., where $R_3$ appearing in the structural formulae is hydrogen. This is accomplished by subjecting the corresponding appropriately substituted 2-benzyl compound to the aforesaid hydrogenolysis procedure of the preceeding example, using the same weight proportions of reactant and reagent as before. For instance, when 1.5 g. of 4'-chloro-3,4-dihydro - 2 - benzyl - 5 - bromo - 3 - oxo - 2H - 1,2-benzothiazine-4-carboxanilide 1,1-dioxide and 2.0 g. (in total) of palladium-on-carbon (10%) react in this manner, the corresponding final product obtained is 4'-chloro-3,4 - dihydro - 5 - bromo - 3 - oxo - 2H - 1,2 - benzothiazine-4-carboxanilide 1,1-dioxide. In like manner, each of the other 2-unsubstituted compounds are similarly obtained.

Example XXXVI

The procedure described in Example VI was repeated except that N-methyl 2,5-dimethylbenzenesulfonamide was the starting material employed in place on N-methyl o-toluenesulfonamide. In this particular case, 33.9 g. (0.17 mole) of N-methyl 2,5-dimethylbenzenesulfonamide in 600 ml. of dry tetrahydrofuran was reacted with 219 ml. of n-butyl lithium (1.6 M) in hexane (0.35 mole), as described in the aforesaid manner, to afford 38 g. (92% yield) of 2-(N-methylsulfamyl)-4-methylphenylacetic acid, M.P. 146–151° C.

The latter compound (36 g.) was then dissolved in 1500 ml. of benzene and cyclyzed exactly as described in the aforementioned example, using 100 mg. of p-toluenesulfonic acid as the catalyst, and there were ultimately obtained in this manner 19.6 g. (51%) of 3,4-dihydro-2,7 - dimethyl - 3 - oxo - 2H - 1,2 - benzothiazine 1,1-dioxide, M.P. 91–93° C. (the melting point was raised to 93–95° C. after recrystallization from isopropanol).

*Analysis.*—Calcd. for $C_{10}H_{11}NO_3S$ (percent): C, 53.31; H, 4.92; N, 6.21. Found (percent): C, 53.08; H, 4.98; N, 6.24.

Example XXXVII

The procedure described in Example VII was repeated except that 3,4 - dihydro - 2,7 - dimethyl - 3 - oxo - 2H-1,2-benzothiazine 1,1-dioxide was the starting material used in place of the corresponding 2-monomethyl compound and p-bromophenyl isocyanate was the reagent employed for said reaction. In this particular case, 2.3 g. (0.010 mole) of said dimethyl compound dissolved in 25 ml. of dimethylsulfoxide was reacted with 2.17 g. (0.011 mole) of p-bromophenyl isocyanate in the presence of 1.01 g. (0.010 mole) of triethylamine. In this manner, there were obtained 1.4 g. (33%) of 4'-bromo-3,4 - dihydro - 2,7 - dimethyl - 3 - oxo - 1,2 - benzothiazine-4-carboxanilide 1,1-dioxide, M.P. 166–168° C. after recrystallization from diethyl ether-hexane.

*Analysis.*—Calcd. for $C_{17}H_{15}BrN_2O_4S$ (percent): C, 48.23; H, 3.57; N, 6.62. Found (percent): C, 47.96; H, 3.61; N, 6.44.

Example XXXVIII

The sodium salt of N - (2 - thiazolyl) - 3,4 - dihydro-2 - methyl - 4 - oxo - 2H - 1,2 - benzothiazine - 3-carboxamide 1,1-dioxide is prepared by dissolving said compound in anhydrous methanol and then adding said solution to another methanolic solution which contains an equivalent amount in moles of sodium methoxide. Upon subsequent evaporation of the solvent therefrom, via freezing-drying, there is obtained the desired alkali metal salt in the form of a yellow solid powder which is freely soluble in water.

In like manner, the potassium and lithium salts are also prepared as are the alkali metal salts of all the other acidic 3,4-dihydro-2H-1,2-benzothiazine 1,1-dioxides of this invention, which were reported previously in the preceding examples.

Example XXXIX

The magnesium salt of 3,4 - dihydro - 2 - methyl - 4-oxo - 2H - 1,2 - benzothiazine - 3 - carboxanilide 1,1-dioxide is prepared by dissolving said compound in water containing an equivalent amount in moles of magnesium oxide and then freeze-drying the mixture. The corresponding calcium salt is also prepared in like manner, as are all the other alkaline-earth metal salts not only of this compound, but also of those acidic 3,4-dihydro-2H-1,2-benzothiazine-1,1-dioxides reported previously in the examples immediately preceding Example XXXVIII.

Example XL

A dry solid pharmaceutical composition is prepared by blending the following materials together in the proportions by weight specified below:

N - (2 - thiazolyl) - 3,4 - dihydro - 2 - methyl - 4-
  oxo - 2H - 1,2 - benzothiazine - 3 - carboxamide
  1,1-dioxide _____ 50
Sodium citrate _____ 25
Alginic acid _____ 10
Polyvinylpyrrolidone _____ 10
Magnesium stearate _____ 5

After the dried composition is thoroughly blended, tablets are punched from the resulting mixture, each tablet being of such size that it contains 100 mg. of the active ingredient. Other tablets are also prepared in a similar manner containing 5, 10, 25 and 50 mg. of the active ingredient, respectively, by merely using the appropriate amount of the 3,4-dihydro-2H-1,2-benzothiazine 1,1-dioxide compound in each case.

Example XLI

A dry solid pharmaceutical composition is prepared by combining the following materials together in the proportions by weight indicated below:

3,4 - dihydro - 2 - methyl - 4 - oxo - 2H - 1,2 - benzo-
  thiazine-3-carboxanilide 1,1-dioxide _____ 50
Calcium carbonate _____ 20
Polyethylene glycol, average molecular weight 4000 _ 30

The dried solid mixture so prepared is then thoroughly agitated so as to obtain a powdered product that is completely uniform. Soft elastic and hard-filled gelatin capsules containing this pharmaceutical composition are then prepared, employing a sufficient quantity of material in each case so as to provide each capsule with 250 mg. of the active ingredient.

What is claimed is:

1. A compound selected from the group consisting of the 3,4-dihydro-2H-1,2-benzothiazine 1,1-dioxides of the formulae:

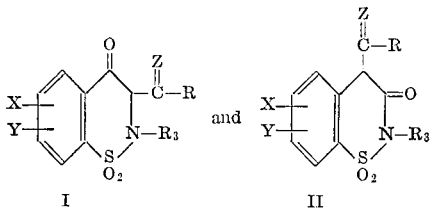

and the base salts thereof with pharmacologically acceptable cations, wherein X and Y are each a member selected from the group consisting of hydrogen, fluorine, chlorine, bromine, nitro, alkyl and alkoxy having from one to five carbon atoms, and trifluoromethyl; R is a member selected from the group consisting of $-OR_1$ and $-NHR_2$ wherein $R_1$ is alkyl having from one to twelve carbon atoms or phenylalkyl having up to three carbon atoms in the alkyl moiety, and $R_2$ is chosen from the group consisting of hydrogen, alkyl having from one to eight carbon atoms, alkenyl having up to six carbon atoms, cycloalkyl having up to eight carbon atoms, phenylalkyl having up to three carbon atoms in the alkyl moiety, phenyl, nitrophenyl, naphthyl, pyridyl, 3-methyl-2-pyridyl, 4-methyl-2-pyridyl, 5-methyl-2-pyridyl, 6-methyl-2-pyridyl, 4,6-dimethyl-2-pyridyl, 5-chloro-2-pyridyl, 5-bromo-2-pyridyl, 5-nitro-2-pyridyl, 3-hydroxy-2-pyridyl, 5-carboxamido-2-pyridyl, 2-pyrazinyl, 2-pyrimidyl, 4,5-dimethyl-2-pyrimidyl, 4-pyrimidyl, 5-methyl-3-pyridazinyl, 6-methoxy-3-pyridazinyl, 1-phenyl-3-pyrazolonyl, 2-thiazolyl, 4-methyl-2-thiazolyl, 4-phenyl-2-thiazolyl, 5-bromo-2-thiazolyl, 4,5-dimethyl-2-thiazolyl, 3-isothiazoyl, 2-benzothiazolyl, 6-methyl-2-benzothiazolyl, 4-chloro-2-benzothiazolyl, 6-bromo-2-benzothiazolyl, 5-chloro-2-benzoxazolyl, 1,3,4-thiadiazolyl, 5-methyl-1,3,4-thiadiazolyl, 1,2,4-triazolyl, 6-phenyl-1,2,4-triazolyl, 7-indazolyl and mono and di-substituted phenyl wherein each substitutent is halogen, hydroxy, alkoxy and thioalkoxy having up to three carbon atoms, alkyl having up to four carbon atoms, trifluoromethyl, acetyl, methylsulfinyl or methylsulfonyl; $R_3$ is a member selected from the group consisting of hydrogen, alkyl having from one to six carbon atoms, alkenyl having up to four carbon atoms and phenylalkyl having up to three carbon atoms in the alkyl moiety; and Z is oxygen or sulfur, except when R is $-OR_1$ when it is oxygen.

2. A 3,4-dihydro-4-oxo-2H-1,2-benzothiazine-3-carboxamide 1,1-dioxide as claimed in claim 1 having the formula I wherein R is $-NHR_2$.

3. A 3,4-dihydro-4-oxo-2H-1,2-benzothiazine-3-carboxamide 1,1-dioxide as claimed in claim 2 wherein X and Y are each hydrogen, Z is oxygen, $R_2$ is phenyl and $R_3$ is alkyl of from one to six carbon atoms.

4. A 3,4-dihydro-4-oxo-2H-1,2-benzothiazine-3-carboxamide 1,1-dioxide as claimed in claim 2 wherein X and Y are each hydrogen, Z is sulfur, $R_2$ is phenyl and $R_3$ is alkyl of from one to six carbon atoms.

5. A 3,4-dihydro-4-oxo-2H-1,2-benzothiazine-3-carboxamide 1,1-dioxide as claimed in claim 2 wherein X and Y are each hydrogen, Z is oxygen, $R_2$ is chlorophenyl and $R_3$ is alkyl of from one to six carbon atoms.

6. A 3,4-dihydro-4-oxo-2H-1,2-benzothiazine-3-carboxamide 1,1-dioxide as claimed in claim 2 wherein X and Y are each hydrogen, Z is oxygen, $R_2$ is phenylalkyl having up to three carbon atoms in the alkyl moiety and $R_3$ is alkyl of from one to six carbon atoms.

7. A 3,4-dihydro-4-oxo-2H-1,2-benzothiazine-3-carboxamide 1,1-dioxide as claimed in claim 2 wherein X and Y are each hydrogen, Z is oxygen, $R_2$ is alkenyl having up to 6 carbon atoms and $R_3$ is alkyl of from one to six carbon atoms.

8. A 3,4-dihydro-4-oxo-2H-1,2-benzothiazine-3-carboxamide 1,1-dioxide as claimed in claim 2 wherein X and Y are each hydrogen, Z is oxygen, $R_2$ is cycloalkyl having up to eight carbon atoms and $R_3$ is alkyl of from one to six carbon atoms.

9. A 3,4-dihydro-4-oxo-2H-1,2-benzothiazine-3-carboxamide 1,1-dioxide as claimed in claim 2 wherein X and Y are each hydrogen, Z is oxygen, $R_2$ is dichlorophenyl and $R_3$ is alkyl of from one to six carbon atoms.

10. A 3,4 - dihydro-4-oxo-2H-1,2-benzothiazine-3-carboxamide 1,1-dioxide as claimed in claim 2 wherein X and Y are each hydrogen, Z is oxygen, $R_2$ is chlorophenyl and $R_3$ is hydrogen.

11. A 3,4 - dihydro - 4-oxo-2H-1,2-benzothiazine-3-carboxamide 1,1-dioxide as claimed in claim 2 wherein X and Y are each hydrogen, Z is oxygen, $R_2$ is 2-thiazolyl and $R_3$ is alkyl of from one to six carbon atoms.

12. A 3,4 - dihydro-4-oxo-2H-1,2-benzothiazine-3-carboxamide 1,1-dioxide as claimed in claim 2 wherein X and Y are each hydrogen, Z is oxygen, $R_2$ is pyridyl and $R_3$ is alkyl of from one to six carbon atoms.

13. A 3,4 - dihydro-4-oxo-2H-1,2-benzothiazine-3-carboxamide 1,1-dioxide as claimed in claim 2 wherein X and Y are each hydrogen, Z is oxygen, $R_2$ is monomethyl 2-pyridyl and $R_3$ is alkyl of from one to six carbon atoms.

14. A 3,4 - dihydro-4-oxo-2H-1,2-benzothiazine-3-carboxylate 1,1-dioxide as claimed in claim 1 having the formula I wherein R is $OR_1$ and Z is oxygen.

15. A 3,4 - dihydro-4-oxo-2H-1,2-benzothiazine-3-carboxylate 1,1-dioxide as claimed in claim 14 wherein X and Y are each hydrogen, $R_1$ is alkyl having from one to twelve carbon atoms and $R_3$ is alkyl of from one to six carbon atoms.

16. A 3,4 - dihydro-4-oxo-2H-1,2-benzothiazine-3-carboxylate 1,1-dioxide as claimed in claim 14 wherein X and Y are hydrogen, $R_1$ is alkyl having from one to twelve carbon atoms and $R_3$ is hydrogen.

17. A 3,4 - dihydro-3-oxo-2H-1,2-benzothiazine-4-carboxamide 1,1-dioxide as claimed in claim 1 having the formula II wherein R is —$NHR_2$.

18. A 3,4 - dihydro-3-oxo-2H-1,2-benzothiazine-4-carboxamide 1,1-dioxide as claimed in claim 17 wherein X and Y are each hydrogen, Z is oxygen, $R_2$ is phenyl and $R_3$ is alkyl of from one to six carbon atoms.

19. A 3,4 - dihydro-3-oxo-2H-1,2-benzothiazine-4-carboxamide 1,1-dioxide as claimed in claim 17 wherein X and Y are each hydrogen, Z is oxygen, $R_2$ is chlorophenyl and $R_3$ is alkyl of from one to six carbon atoms.

20. A 3,4 - dihydro-3-oxo-2H-1,2-benzothiazine-4-carboxamide 1,1-dioxide as claimed in claim 17 wherein X and Y are each hydrogen, Z is oxygen, $R_2$ is pyridyl and $R_3$ is alkyl of from one to six carbon atoms.

21. A 3,4 - dihydro-3-oxo-2H-1,2-benzothiazine-4-carboxamide 1,1-dioxide as claimed in claim 17 wherein X and Y are each hydrogen, Z is oxygen, $R_2$ is dichlorophenyl and $R_3$ is alkyl having from one to six carbon atoms.

22. A 3,4 - dihydro-3-oxo-2H-1,2-benzothiazine-4-carboxamide 1,1-dioxide as claimed in claim 17 wherein X and Y are each hydrogen, Z is oxygen, $R_2$ is bromophenyl and $R_3$ is alkyl of from one to six carbon atoms.

23. A 3,4 - dihydro-3-oxo-2H-1,2-benzothiazine-4-carboxamide 1,1-dioxide as claimed in claim 17 wherein X and Y are each hydrogen, Z is oxygen, $R_2$ is naphthyl and $R_3$ is alkyl of from one to six carbon atoms.

24. A 3,4 - dihydro-3-oxo-2H-1,2-benzothiazine-4-carboxamide 1,1-dioxide as claimed in claim 17 wherein X and Y are each hydrogen, Z is oxygen, $R_2$ is alkyl having from one to eight carbon atoms and $R_3$ is alkyl of from one to six carbon atoms.

25. A 3,4 - dihydro-3-oxo-2H-1,2-benzothiazine-4-carboxamide 1,1-dioxide as claimed in claim 17 wherein X is hydrogen, Y is alkyl having from one to five carbon atoms, Z is oxygen, $R_2$ is dichlorophenyl and $R_3$ is alkyl of from one to six carbon atoms.

26. A 3,4 - dihydro-3-oxo-2H-1,2-benzothiazine-4-carboxamide 1,1-dioxide as claimed in claim 17 wherein X is hydrogen, Y is alkyl having from one to five carbon atoms, Z is oxygen, $R_2$ is bromophenyl and $R_3$ is alkyl of from one to six carbon atoms.

27. A 3,4 - dihydro-3-oxo-2H-1,2-benzothiazine-4-carboxamide 1,1-dioxide as claimed in claim 17 wherein X and Y are each hydrogen, Z is oxygen, $R_2$ is phenyl and $R_3$ is phenylalkyl having up to three carbon atoms in the alkyl moiety.

28. A 3,4 - dihydro-3-oxo-2H-1,2-benzothiazine-4-carboxamide 1,1-dioxide as claimed in claim 17 wherein X and Y are each hydrogen, Z is oxygen, $R_2$ is 2-thiazolyl and $R_3$ is alkyl of from one to six carbon atoms.

29. A 3,4 - dihydro-3-oxo-2H-1,2-benzothiazine-4-carboxylate 1,1-dioxide as claimed in claim 1 having the Formula II wherein R is $OR_1$ and Z is oxygen.

30. A 3,4 - dihydro-3-oxo-2H-1,2-benzothiazine-4-carboxylate 1,1-dioxide as claimed in claim 29 wherein X and Y are each hydrogen, $R_1$ is alkyl having from one to twelve carbon atoms and $R_3$ is alkyl of from one to six carbon atoms.

31. 3,4-dihydro - 2 - methyl-4-oxo-2H-1,2-benzothiazine-3-carboxanilide 1,1-dioxide.

32. N-(2-thiazolyl) - 3,4 - dihydro-2-methyl-4-oxo-2H-1,2-benzothiazine-3-carboxamide 1,1-dioxide.

33. N-(6-methyl - 2 - pyridyl)-3,4-dihydro-2-methyl-4-oxo-2H-1,2-benzothiazine-3-carboxamide 1,1-dioxide.

34. Methyl 3,4 - dihydro-2-methyl-4-oxo-2H-1,2-benzothiazine-3-carboxylate 1,1-dioxide.

35. 2'-4'-dichloro-3,4-dihydro-2-methyl - 3 - oxo - 2H-1,2-benzothiazine-4-carboxanilide 1,1-dioxide.

36. 4'-bromo-3,4-dihydro - 2 - methyl-3-oxo-2H-1,2-benzothiazine-4-carboxanilide 1,1-dioxide.

37. Ethyl 3,4-dihydro - 2 - methyl-3-oxo-2H-1,2-benzothiazine-4-carboxylate 1,1-dioxide.

References Cited

UNITED STATES PATENTS

| | | | |
|---|---|---|---|
| 3,284,450 | 11/1966 | Kraaijeveld et al. | 260—243 |
| 3,501,466 | 3/1970 | Rasmussen | 260—243 |

OTHER REFERENCES

Fieser et al.: "Basic Organic Chemistry," D. C. Heath and Co., Pub., Boston (1959), pp. 205-6.

JOHN M. FORD, Primary Examiner

U.S. Cl. X.R.

424—246